(12) United States Patent
    Xiao et al.

(10) Patent No.: US 12,656,562 B2
(45) Date of Patent: Jun. 16, 2026

(54) OPTICAL ENGINE ASSEMBLY, OPTICAL INTERCONNECTION SYSTEM, AND NETWORK DEVICE

(71) Applicant: HUAWEI TECHNOLOGIES CO., LTD., Shenzhen (CN)

(72) Inventors: Xiaokang Xiao, Dongguan (CN); Huiping Li, Shanghai (CN); Yang Li, Shanghai (CN); Hiroshi Furukawa, Yokohama (JP)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 271 days.

(21) Appl. No.: 18/518,756

(22) Filed: Nov. 24, 2023

(65) Prior Publication Data

US 2024/0085649 A1      Mar. 14, 2024

Related U.S. Application Data

(63) Continuation of application No. PCT/CN2022/093621, filed on May 18, 2022.

(30) Foreign Application Priority Data

May 27, 2021    (CN) .......................... 202110587294.2

(51) Int. Cl.
    H04B 10/00 (2013.01)
    G02B 6/42 (2006.01)
(52) U.S. Cl.
    CPC ......... G02B 6/4293 (2013.01); G02B 6/4231 (2013.01); G02B 6/4243 (2013.01); G02B 6/428 (2013.01)

(58) Field of Classification Search
    CPC .. G02B 6/4293; G02B 6/4231; G02B 6/4243; G02B 6/428; G02B 6/3885;
    (Continued)

(56) References Cited

U.S. PATENT DOCUMENTS

| | | | | |
|---|---|---|---|---|
| 5,790,733 | A | * | 8/1998 | Smith ................. G02B 6/4249 385/59 |
| 5,940,562 | A | * | 8/1999 | Henson ................. G02B 6/424 385/94 |

(Continued)

FOREIGN PATENT DOCUMENTS

| | | |
|---|---|---|
| CN | 103278894 A | 9/2013 |
| CN | 107003487 A | 8/2017 |

(Continued)

OTHER PUBLICATIONS

Extended European Search Report for Application No. 22810433 dated Oct. 4, 2024, 8 pages.

(Continued)

*Primary Examiner* — Agustin Bello

(57) ABSTRACT

This application relates to the field of optical communication technologies. An optical engine assembly, an optical interconnection system, and a network device are provided. The optical engine assembly includes an optical engine, a coupling base, and a fiber array unit. A first guide portion is disposed on the coupling base, a second guide portion is disposed on the fiber array unit, and one of the first guide portion and the second guide portion is a guide rod. The other of the first guide portion and the second guide portion is a guide hole, and the guide rod is pluggably connected to the guide hole. The optical engine is configured to implement conversion between an optical signal and an electrical signal.

11 Claims, 15 Drawing Sheets

(58) Field of Classification Search

CPC .. G02B 6/3897; G02B 6/4249; G02B 6/4292; G02B 6/426; G02B 6/4261

See application file for complete search history.

(56) References Cited

U.S. PATENT DOCUMENTS

| | | | | |
|---|---|---|---|---|
| 6,374,004 B1* | 4/2002 | Han | G02B 6/4249 | 385/88 |
| 6,390,690 B1* | 5/2002 | Meis | G02B 6/3897 | 385/88 |
| 6,599,032 B1* | 7/2003 | Kurashima | G02B 6/4245 | 385/24 |
| 6,821,028 B2* | 11/2004 | Morris | G02B 6/4231 | 385/52 |
| 7,137,746 B2* | 11/2006 | Kato | G02B 6/4292 | 385/94 |
| 7,287,914 B2* | 10/2007 | Fujiwara | G02B 6/4214 | 385/52 |
| 7,344,318 B2* | 3/2008 | Lu | G02B 6/4292 | 385/52 |
| 7,352,969 B2* | 4/2008 | Kim | G06F 1/1683 | 398/139 |
| 7,553,091 B2* | 6/2009 | McColloch | G02B 6/3825 | 385/59 |
| 7,665,911 B2* | 2/2010 | Hamazaki | G02B 6/421 | 385/32 |
| RE44,664 E * | 12/2013 | McColloch | G02B 6/4214 | 385/115 |
| 9,011,020 B2* | 4/2015 | Ty Tan | G02B 6/30 | 385/53 |
| 9,134,490 B2* | 9/2015 | Feng | G02B 6/4249 | |
| 9,207,414 B2* | 12/2015 | Lin | G02B 6/4206 | |
| 9,268,107 B2* | 2/2016 | Tan | G02B 6/4269 | |
| 9,341,786 B1* | 5/2016 | Gamache | G02B 6/30 | |
| 9,588,311 B2* | 3/2017 | Furuya | G02B 6/4244 | |
| 9,680,573 B2* | 6/2017 | Lin | G02B 6/4269 | |
| 10,222,566 B1* | 3/2019 | Doerr | G02B 6/4231 | |
| 10,578,799 B2* | 3/2020 | Doerr | G02B 6/428 | |
| 10,606,003 B2* | 3/2020 | Peterson | G02B 6/4246 | |
| 11,112,574 B1* | 9/2021 | Mathai | G02B 6/4292 | |
| 11,719,898 B2* | 8/2023 | Nagarajan | G02B 6/4214 | 398/164 |
| 2003/0053767 A1* | 3/2003 | Cheng | G02B 6/4292 | 385/52 |
| 2005/0047795 A1 | 3/2005 | Windover et al. | | |
| 2005/0259927 A1* | 11/2005 | Kato | G02B 6/4204 | 385/88 |
| 2006/0251360 A1* | 11/2006 | Lu | G02B 6/4292 | 385/88 |
| 2008/0095502 A1* | 4/2008 | McColloch | G02B 6/3825 | 385/71 |
| 2008/0232737 A1* | 9/2008 | Ishigami | G02B 6/4284 | 385/88 |
| 2009/0297099 A1* | 12/2009 | Benjamin | G02B 6/4257 | 385/32 |
| 2012/0263415 A1* | 10/2012 | Tan | G02B 6/34 | 385/33 |
| 2013/0156386 A1* | 6/2013 | Miller | G02B 6/4284 | 385/92 |
| 2013/0195396 A1 | 8/2013 | Julien et al. | | |
| 2014/0010498 A1* | 1/2014 | Verslegers | G02B 6/26 | 385/37 |
| 2014/0153881 A1* | 6/2014 | Liff | G02B 6/4214 | 385/89 |
| 2014/0161396 A1* | 6/2014 | Feng | G02B 6/423 | 385/83 |
| 2015/0037044 A1* | 2/2015 | Peterson | G02B 6/4292 | 398/135 |
| 2015/0125110 A1* | 5/2015 | Anderson | G02B 6/3897 | 385/14 |
| 2015/0153520 A1* | 6/2015 | Lin | G02B 6/43 | 385/89 |
| 2015/0323753 A1* | 11/2015 | Furuya | G02B 6/423 | 385/14 |
| 2016/0370544 A1* | 12/2016 | Badihi | G02B 6/30 | |
| 2017/0059790 A1* | 3/2017 | Koyama | G02B 6/4239 | |
| 2017/0131469 A1* | 5/2017 | Kobrinsky | G02B 6/4257 | |
| 2017/0192177 A1* | 7/2017 | Nekado | G02B 6/4232 | |
| 2017/0212307 A1* | 7/2017 | Jiang | G02B 6/3672 | |
| 2017/0261701 A1* | 9/2017 | Izawa | G02B 6/4292 | |
| 2017/0299824 A1* | 10/2017 | Vallance | G02B 6/4214 | |
| 2017/0351044 A1* | 12/2017 | Xu | G02B 6/4256 | |
| 2018/0267265 A1* | 9/2018 | Zhang | G02B 6/4261 | |
| 2019/0033537 A1* | 1/2019 | Suematsu | G02B 6/42 | |
| 2019/0384007 A1* | 12/2019 | Matiss | G02B 6/1225 | |
| 2019/0391350 A1* | 12/2019 | Evans | G02B 6/4292 | |
| 2020/0044739 A1* | 2/2020 | Sugiyama | G01M 11/33 | |
| 2020/0158961 A1* | 5/2020 | Fini | G02B 6/30 | |
| 2020/0183109 A1* | 6/2020 | Peterson | G02B 6/4292 | |
| 2020/0249395 A1* | 8/2020 | Pezeshki | H04B 10/506 | |
| 2020/0363594 A1* | 11/2020 | Lu | G02B 6/30 | |
| 2021/0132309 A1* | 5/2021 | Zhang | G02B 6/4249 | |
| 2021/0263236 A1* | 8/2021 | Janta-Polczynski | G02B 6/3829 | |
| 2021/0274673 A1* | 9/2021 | Blackburn | H01L 23/4093 | |
| 2021/0286129 A1* | 9/2021 | Fini | G02B 6/12007 | |
| 2021/0333494 A1* | 10/2021 | dos Santos Fegadolli | G02B 6/4269 | |
| 2022/0196929 A1* | 6/2022 | Toda | G02B 6/4204 | |
| 2022/0196939 A1* | 6/2022 | Toda | G02B 6/4249 | |
| 2022/0196941 A1* | 6/2022 | Toda | G02B 6/4292 | |
| 2022/0283360 A1* | 9/2022 | Nagarajan | G02B 6/4257 | |
| 2023/0152537 A1* | 5/2023 | Witzens | G02B 6/2773 | 385/33 |
| 2024/0085649 A1* | 3/2024 | Xiao | G02B 6/3885 | |

FOREIGN PATENT DOCUMENTS

| | | |
|---|---|---|
| JP | 2001042168 A | 2/2001 |
| JP | 2005080292 A | 3/2005 |
| JP | 2008224954 A | 9/2008 |
| JP | 2013544447 A | 12/2013 |
| JP | 2015212781 A | 11/2015 |
| JP | 2017044844 A | 3/2017 |
| WO | 2013006499 A2 | 1/2013 |

OTHER PUBLICATIONS

PCT International Search Report for Application No. PCT/CN2022/093621 dated May 18, 2022, 10 pages.

Japanese Patent Office Notice of Reasons for Rejection for Application No. 2023-572939 dated Sep. 17, 2024, 14 pages.

* cited by examiner

1000

1000

OPTICAL ENGINE ASSEMBLY, OPTICAL INTERCONNECTION SYSTEM, AND NETWORK DEVICE

CROSS-REFERENCE TO RELATED APPLICATIONS

This application is a continuation of International Application No. PCT/CN2022/093621, filed on May 18, 2022, which claims priority to Chinese Patent Application No. 202110587294.2, filed on May 27, 2021. The disclosures of the aforementioned applications are hereby incorporated by reference in their entireties.

TECHNICAL FIELD

This application relates to the field of optical communication technologies, and in particular, to an optical engine assembly, an optical interconnection system, and a network device.

BACKGROUND

As a communication bandwidth of a data center continuously evolves, requirements on density of optical fiber communication are increasingly high, and optical-electrical packaging becomes a development trend of optical communication modules. The optical-electrical packaging means that an optical chip and an electrical chip (also referred to as an integrated circuit chip) are placed in a same packaging structure. It is assumed that in an optoelectronic communication system, a switching capacity of an electrical switching chip is already increased to 51.2 T, a capacity that can be carried by one optical signal is 100 G, a capacity of one optical engine (OE) is 6.4 T, and a quantity of optical fibers that need to be fanned out by one optical engine by using one fiber array unit (FAU) is 148. If eight such optical engines are disposed in one optical interconnection system, a total quantity of optical fibers that need to be fanned out exceeds 1000. Such a large quantity of optical fibers poses an extremely high requirement on coupling and assembly between the fiber array unit and the optical engine.

In an existing solution in which a fiber array unit is assembled on an optical engine, an optical path interconnection is performed on a chip coupling base and the optical engine through active coupling, the chip coupling base is bonded to the optical engine by using an adhesive, an optical path interconnection is performed on the fiber array unit and the chip coupling base through active coupling, and the fiber array unit is bonded to the chip coupling base. Active coupling means that light needs to pass through and an insertion loss of an optical path needs to be monitored during connection and assembly of an optical device. When an assembly location is adjusted until a minimum insertion loss of the optical path is obtained, the optical path is fastened. However, in such an assembly manner, assembly efficiency is relatively low, and once an optical fiber cut occurs, an assembled component needs be scrapped and cannot be repaired.

SUMMARY

Embodiments of this application provide an optical engine assembly, an optical interconnection system, and a network device that can increase assembly efficiency and improve maintainability.

According to a first aspect, this application provides an optical engine assembly, including an optical engine, a coupling base, and a fiber array unit. The coupling base is fastened on the optical engine, a first guide portion is disposed on the coupling base, a second guide portion is disposed on the fiber array unit, one of the first guide portion and the second guide portion is a guide rod, the other of the first guide portion and the second guide portion is a guide hole, the guide rod is pluggably connected to the guide hole, and the optical engine is configured to implement conversion between an optical signal and an electrical signal. An optical signal transmitted between the fiber array unit and the optical engine also passes through the coupling base. The optical signal that is input from the fiber array unit passes through the coupling base and reaches the optical engine, and/or an optical signal that is output by the optical engine passes through the coupling base and reaches the fiber array unit for outputting.

Because the second guide portion of the fiber array unit and the first guide portion of the coupling base are pluggably connected together, the fiber array unit is pluggably connected to the coupling base, so that passive coupling between the fiber array unit and the coupling base is implemented, and assembly efficiency of the optical engine assembly is increased. In addition, if an optical fiber cut occurs in the fiber array unit, the faulty fiber array unit may be removed and replaced with a new fiber array unit. This improves maintainability of the optical engine assembly. The passive coupling is an assembly manner in which no light needs to pass through or no insertion loss of an optical path needs to be monitored during assembly of an optical device, but accurate localization is performed by using a mechanical part.

In addition, when a substrate carrying the optical engine assembly needs to be soldered, for example, when the substrate is soldered onto a system circuit board of a network device by using a reflow soldering process, where a soldering temperature of the reflow soldering is up to 260° C., the fiber array unit may be removed first, the optical engine, the coupling base, and the substrate may form a pre-fabricated body, and the substrate of the pre-fabricated body is soldered onto the system circuit board. After the soldering is completed, the fiber array unit is pluggably connected to the coupling base, to prevent the fiber array unit from being damaged due to a high soldering temperature.

According to the first aspect, the optical engine includes a core and a first optical conduction portion disposed on the core, the coupling base further includes a base and a second optical conduction portion, the base is fastened on the core, the base and the core are disposed in a stacked manner, the second optical conduction portion is built in the base, the first optical conduction portion is optically coupled to the second optical conduction portion, and the first guide portion is disposed on a surface that is of the base and that is away from the core.

When the base is fastened on the core, the base and the core are disposed in a stacked manner. A location of the first optical conduction portion is not limited in this application. The first optical conduction portion may be built in the core, or the first optical conduction portion may be disposed on a surface that is of the core and that faces the base or another surface. For example, the base includes a first surface and a second surface that are disposed opposite to each other. When the base is fastened on the core, the first surface is connected to the core fixedly, and the second surface is located on a surface that is of the base and that is away from the core. The first guide portion is disposed on the surface that is of the base and that is away from the core, that is, the first guide portion is disposed on the second surface.

The coupling base performs optical conduction in a manner of building the second optical conduction portion in the base instead of providing an air gap. When the coupling base is bonded to the optical engine by using an adhesive, a possibility that the adhesive pollutes an optical path is reduced.

According to the first aspect, in a first possible implementation of the first aspect of this application, the optical engine assembly further includes a limiting part, and the limiting part is configured to limit a relative location between the fiber array unit and the coupling base, to reduce a possibility of motion of the fiber array unit relative to the coupling base, thereby preventing the fiber array unit from being detached from the coupling base.

According to the first aspect or the first possible implementation of the first aspect of this application, in a second possible implementation of the first aspect of this application, the limiting part includes a main body and an elastic arm disposed in a manner of being connected to the main body, the main body covers the coupling base and the fiber array unit, the elastic arm abuts against the fiber array unit, and the fiber array unit is limited to the coupling base by using elastic force of the elastic arm, thereby enhancing connection stability between the coupling base and the fiber array unit. "Abutting" means that two elements apply force to each other to resist each other.

According to the first aspect or the first or second possible implementation of the first aspect of this application, in a third possible implementation of the first aspect of this application, the main body has a hollow cavity, the coupling base is accommodated in the hollow cavity fixedly, the fiber array unit penetrates the hollow cavity, and a side wall of the hollow cavity is attached to the coupling base and the fiber array unit. Because the coupling base is enclosed in the main body, one end that is of the fiber array unit and that is connected to the coupling base is enclosed in the main body, thereby reducing a possibility that the coupling base and the fiber array unit are polluted during assembly and use.

According to the first aspect or the first to third possible implementations of the first aspect of this application, in a fourth possible implementation of the first aspect of this application, the elastic arm includes a connecting portion and an abutting portion that are connected to each other, a groove that is formed through the side wall of the hollow cavity is provided on the main body, the groove includes a first end and a second end that are disposed opposite to each other in a direction in which the base and the core are stacked, the first end of the groove is disposed at one end that is of the groove and that is close to the optical engine, the connecting portion is fastened on a side wall of the first end of the groove, the elastic arm is accommodated in and extends along the groove, and the abutting portion is exposed from the second end of the groove and abuts against the fiber array unit. Because the main body is provided with the groove, a deformation capability of the main body is enhanced, thereby facilitating plugging and removal of the fiber array unit.

According to the first aspect or the first to fourth possible implementations of the first aspect of this application, in a fifth possible implementation of the first aspect of this application, the elastic arm includes a first elastic arm and a second elastic arm, the main body includes a first end and a second end that are disposed opposite to each other in a direction in which the base and the core are stacked, the first end of the main body is attached to the core, a connecting portion of the first elastic arm is connected to the first end of the main body fixedly, a connecting portion of the second elastic arm is connected to the second end of the main body fixedly, the main body, the first elastic arm, and the second elastic arm jointly enclose clamping space, the coupling base and the fiber array unit are accommodated in the clamping space, and an abutting portion of the second elastic arm abuts against the fiber array unit.

Because the optical engine, the coupling base, and the fiber array unit are assembled together by using the first elastic arm and the second elastic arm of the limiting part, connection stability between the coupling base and the optical engine is further improved, and connection stability between the coupling base and the fiber array unit is enhanced, thereby improving stability of an optical path.

According to the first aspect or the first to fifth possible implementations of the first aspect of this application, in a sixth possible implementation of the first aspect of this application, the optical engine assembly further includes a reinforcing pad, the reinforcing pad is provided with an accommodation groove, the optical engine penetrates through the accommodation groove and is fastened together with the reinforcing pad, the base is fastened onto the reinforcing pad, the abutting portion of the first elastic arm abuts against the reinforcing pad, and the reinforcing pad is located between the first elastic arm and the base.

A contact area (for example, a bonding area) between the optical engine and the coupling base is increased by using the reinforcing pad, so that connection stability between the coupling base and the optical engine is enhanced (for example, bonding force is increased), and a risk that the coupling base falls off due to plugging and removal is reduced.

According to the first aspect or the first to sixth possible implementations of the first aspect of this application, in a seventh possible implementation of the first aspect of this application, the core includes a first mounting surface, a second mounting surface, and a side surface, the side surface is connected between the first mounting surface and the second mounting surface fixedly, the base is fastened on the first mounting surface, the first optical conduction portion includes an optical waveguide and a refraction member on which an optical path interconnection is performed, an optical path interconnection is performed on the refraction member and the second optical conduction portion, and an optical path interconnection is performed on the refraction member and the second optical conduction portion. The refraction member is configured to change a transmission direction of light. For example, after a transmission direction of light that is incident from the fiber array unit to the second optical conduction portion is changed by using the refraction member, the light reaches the optical waveguide. After a transmission direction of the light that is output from the optical waveguide is changed by using the refraction member, the light is incident to the second conduction portion and then reaches the fiber array unit. The coupling base and the optical engine are coupled by using the refraction member, and a transmission direction of light is changed by using the refraction member, thereby improving flexibility of an optical path design. The refraction member includes an optical device that can change a transmission direction of light, such as a grating or a reflector.

According to the first aspect or the first to seventh possible implementations of the first aspect of this application, in an eighth possible implementation of the first aspect of this application, the first optical conduction portion includes an optical waveguide, the optical waveguide is built in the core, the core includes a first mounting surface, a second mounting surface, and a side surface, the side surface is connected between the first mounting surface and the second mounting surface fixedly, the second mounting surface is connected to a substrate, a light guide surface of the optical waveguide is located on the side surface, the base is fastened on the side surface, and the second optical conduction portion is optically coupled to the light guide surface. A transmission direction of light in the optical waveguide and the second optical conduction portion is parallel to an arrangement direction of the coupling base and the fiber array unit, and an optical path formed by the second optical conduction portion, the coupling base, and the fiber array unit is not bent, so that an optical loss on the optical path can be reduced.

According to the first aspect or the first to eighth possible implementations of the first aspect of this application, in a ninth possible implementation of the first aspect of this application, the fiber array unit includes a light guide base and an optical fiber fastened on the light guide base, an abutting step is convexly disposed on an outer wall of the light guide base, the light guide base, the base, and the core are sequentially disposed in a stacked manner, the second guide portion is disposed on a surface that is of the guide base and that faces the base, and the elastic arm abuts against the abutting step. The abutting step is configured to limit motion of the light guide base relative to the main body, to improve transmission stability of an optical path.

According to a second aspect, this application provides an optical interconnection system, including a substrate, an electrical switching chip, and the optical engine assembly according to the first aspect or the first to ninth possible implementations of the first aspect, where the electrical switching chip is disposed on the substrate, the optical engine assembly is disposed on the substrate, and the electrical switching chip is electrically connected to an optical engine of the optical engine assembly. The electrical switching chip is configured to: send an output electrical signal to the optical engine and receive an input electrical signal from the optical engine.

According to a second aspect, in a first possible implementation of the second aspect of this application, the substrate includes a first substrate and a second substrate that are disposed in a stacked manner, the electrical switching chip is disposed on a surface that is of the second substrate and that is away from the first substrate, and the optical engine is disposed on the surface that is of the second substrate and that is away from the first substrate.

According to a third aspect, this application provides a network device, including a system circuit board and the optical interconnection system according to the second aspect or the first possible implementation of the second aspect, where the optical interconnection system is disposed on the system circuit board.

DESCRIPTION OF EMBODIMENTS

Figure 1:
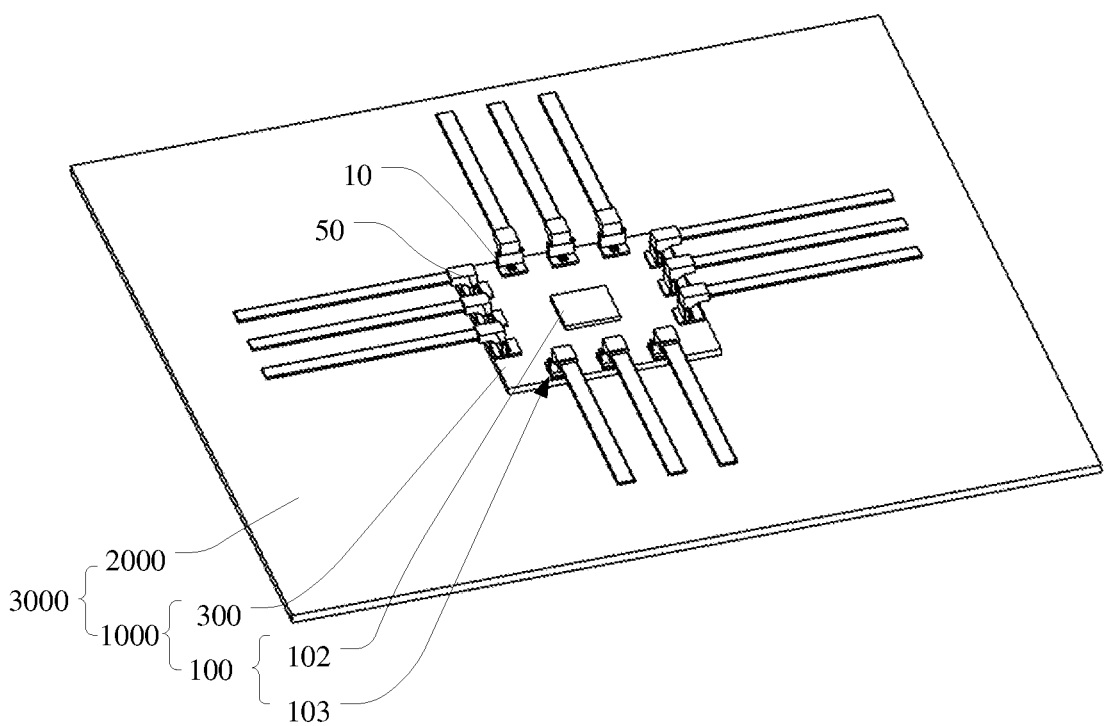
FIG. 1 is a schematic three-dimensional diagram of an assembled optical interconnection system according to a first implementation of this application.

As a communication bandwidth of a data center continuously evolves, requirements on density of optical fiber communication are increasingly high, and optical-electrical packaging becomes a development trend of optical communication modules. The optical-electrical packaging means that an optical module and an electrical module are packaged as a whole. It is assumed that in an optical communication system, a switching capacity of an electrical switching chip is already increased to 51.2 T, and a capacity that can be carried by one optical signal is 100 G. A capacity of one optical engine (OE) is up to 6.4 T, and a quantity of optical fibers that need to be fanned out by one optical engine by using one fiber array unit (FAU) is up to 148. If eight such optical engines are disposed in one optical interconnection system, a total quantity of optical fibers that need to be fanned out exceeds 1000. Such a large quantity of optical fibers poses an extremely high requirement on coupling and assembly on the fiber array unit.

In an existing solution in which a fiber array unit is assembled on an optical engine, an optical path interconnection is performed on a chip coupling base and the optical engine through active coupling, the chip coupling base is bonded to the optical engine by using an adhesive, an optical path interconnection is performed on the fiber array unit and the chip coupling base through active coupling, and the fiber array unit is bonded to the chip coupling base. An air gap is formed on a surface that is of the chip coupling base and that is away from the optical engine. A lens is disposed on a side wall that is of the air gap and that is close to one end of the optical engine. The fiber array unit includes an optical fiber coupling part and an optical fiber array pluggably connected to the optical fiber coupling part. The optical fiber coupling part is bonded to a surface that is of the chip coupling base and that is away from the optical engine and covers the air gap. A prism is disposed on the optical fiber coupling part. The fiber array unit is fastened on the optical fiber coupling part. An optical signal emitted by the optical engine is used as an example. The optical signal passes through the lens on the side wall of the air gap, is reflected by the prism, and is then incident to the optical fiber array.

In the foregoing assembly solution, an optical path interconnection is performed on the fiber array unit and the chip coupling base through active coupling. However, during the active coupling, light needs to pass through and an insertion loss of the optical path needs to be monitored, thereby affecting assembly efficiency. In addition, the chip coupling base is fastened to the optical engine by using the adhesive, and the optical fiber coupling part is connected to the chip coupling base fixedly by using the adhesive. If an optical fiber cut occurs in the optical fiber array, the entire system is scrapped, thereby leading to poor maintainability. In addition, in a process of fastening the chip coupling base to the optical engine and in a process of fastening the optical fiber coupling part to the chip coupling base, the adhesive easily intrudes into the air gap, thereby causing the optical path to be polluted and causing a defect.

In a related technology, during both an electrical connection between a substrate and an optical engine and an electrical connection between the substrate and a system circuit board, radio frequency performance and a loss may need to be ensured through reflow soldering (a temperature is up to 260° C.). However, the optical fiber coupling part and an optical fiber are not resistant to a high temperature. Consequently, an electrical coupling process is incompatible with an optical coupling process. During assembly, electrical coupling (an electrical connection between devices) is usually completed first, and then optical coupling (an optical path interconnection between devices) is performed. This exerts a high requirement on a coupling process, development of a plurality of fixtures is required, universality is poor, and production efficiency is low.

Based on this, this application provides an optical engine assembly and an optical interconnection system and a network device that are related to the optical engine assembly. The optical engine assembly includes an optical engine, a coupling base, and a fiber array unit. The coupling base is fastened on the optical engine. One of a first guide portion and a second guide portion is a guide rod, the other of the first guide portion and the second guide portion is a guide hole, the guide rod is pluggably connected to the guide hole, and the optical engine is configured to implement conversion between an optical signal and an electrical signal. An optical signal transmitted between the fiber array unit and the optical engine also passes through the coupling base. The optical signal that is input from the fiber array unit passes through the coupling base and reaches the optical engine, and/or an optical signal that is output by the optical engine passes through the coupling base and reaches the fiber array unit for outputting.

The following further describes the optical engine assembly and the optical interconnection system related to the optical engine assembly based on specific implementations and accompanying drawings.

As shown in FIG. 1, a first implementation of this application provides a network device 3000, including one or more optical interconnection systems 1000 and a system circuit board 2000. The optical interconnection system 1000 is disposed on the system circuit board 2000, and the optical interconnection system 1000 is electrically connected to the system circuit board 2000. The network device 3000 performs an information exchange with another device by using the optical interconnection system 1000. In this implementation, the network device 3000 is a switch. It may be understood that a type of the network device 3000 is not limited in this application. The network device 3000 may alternatively be a router, a central office end device of an access network, a service board of a frame-shaped device in a telecommunications room or a data center equipment room, a baseband unit of a radio base station, or the like.

Figure 2:
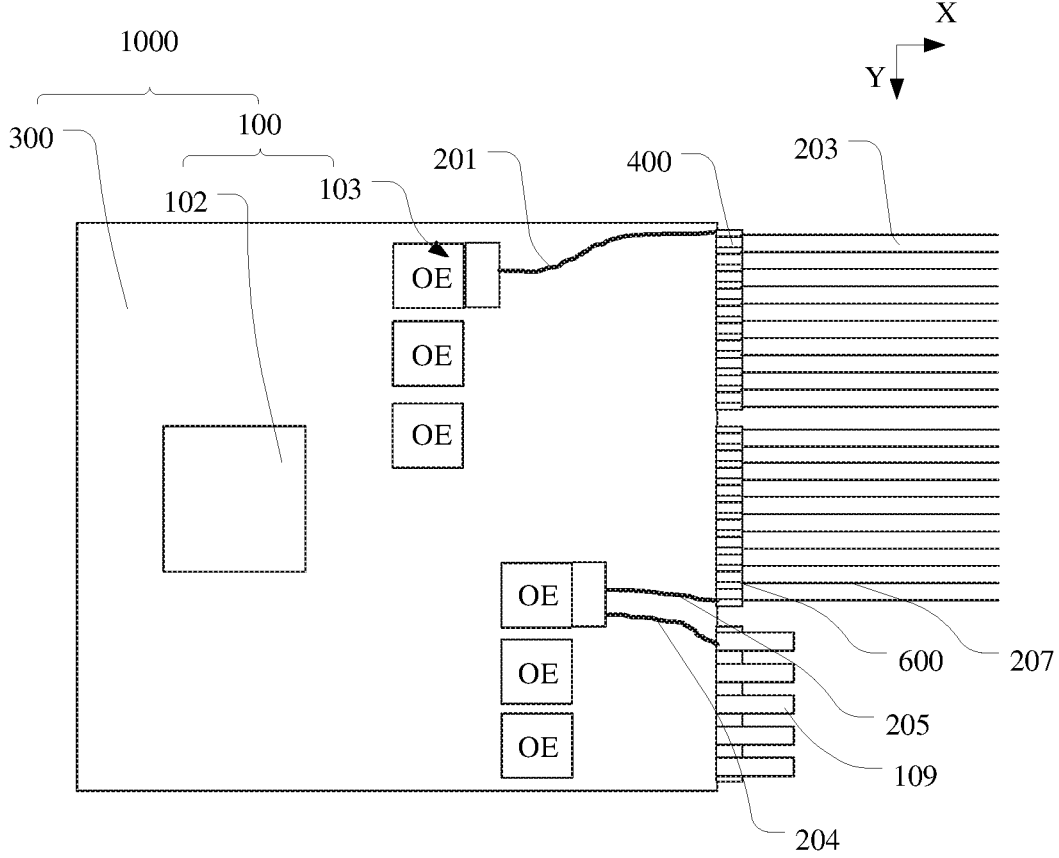
FIG. 2 is a schematic diagram of a plane of an optical interconnection system according to a first implementation of this application.

As shown in FIG. 2, the optical interconnection system 1000 includes an optical communication component 100, a substrate 300, a transmit-end optical fiber interface 400, and a receive-end optical fiber interface 600. The optical communication component 100, the transmit-end optical fiber interface 400, and the receive-end optical fiber interface 600 are all disposed on the substrate 300. In this implementation, the substrate 300 is a board of the switch, and the substrate 300 includes at least one circuit board. The substrate 300 is approximately flat, and extends along a first direction (for example, an X direction shown in FIG. 2) and a second direction (for example, a Y direction shown in FIG. 2, where the X direction is perpendicular to the Y direction). The first direction is different from the second direction.

The optical communication component 100 includes an electrical switching chip 102 and one or more optical engine assemblies 103 (FIG. 2 shows only several optical engine assemblies as an example). All of the electrical switching chip 102 and the one or more optical engine assemblies 103 are disposed on the substrate 300. The electrical switching chip 102 is electrically connected to the one or more optical engine assemblies 103. The electrical switching chip 102 is configured to: send an output electrical signal to the optical engine assembly 103 and receive an input electrical signal from the optical engine assembly 103. The optical engine assembly 103 is configured to: convert the output electrical signal into an output optical signal for outputting, and/or convert a received input optical signal into an input electrical signal and transmit the input electrical signal to the electrical switching chip 102.

In this implementation, based on signal sending and receiving, the optical engine assembly 103 includes a sending optical engine assembly and a receiving optical engine assembly. The sending optical engine assembly is connected to the transmit-end optical fiber interface 400 through a transmit-end optical fiber 201 (FIG. 2 shows only one as an example), and the transmit-end optical fiber interface 400 is connected to an external device (not shown in the figure) by using an external transmit-end optical fiber 203 (FIG. 2 shows only several external transmit-end optical fibers as an example). The sending optical engine assembly is configured to: receive the output electrical signal that is output by the electrical switching chip 102, and convert the output electrical signal into an output optical signal. The output optical signal passes through the transmit-end optical fiber 201, the transmit-end optical fiber interface 400, and the external transmit-end optical fiber 203 and is then output to the external device. In this implementation, the sending optical engine assembly is connected to an external light source pool 109 by using a light source pool fiber 204 (FIG. 2 shows only one light source pool fiber as an example). An unmodulated laser emitted from the external light source pool 109 is sent through the light source pool fiber 204 and is coupled to the optical engine assembly. The sending optical engine assembly modulates and converts the laser into an output optical signal based on the output electrical signal, is connected to the transmit-end optical fiber interface 400 through the transmit-end optical fiber 201, and further transmits the output optical signal to the external transmit-end optical fiber 203, to complete signal sending. It may be understood that a light source may alternatively be built in the sending optical engine assembly.

The receiving optical engine assembly is electrically connected to the electrical switching chip 102. The receiving optical engine assembly is connected to the receive-end optical fiber interface 600 through a receive-end optical fiber 205 (FIG. 2 shows only one receive-end optical fiber as an example). The receive-end optical fiber interface 600 is connected to an external device (not shown in the figure) through an external receive-end optical fiber 207 (FIG. 2 shows only several external receive-end optical fibers as an example). An input optical signal transmitted by the external device to the network device 3000 by using the external receive-end optical fiber 207 passes through the receive-end optical fiber 205 and is transmitted to the receiving optical engine assembly through the receive-end optical fiber interface 600. The receiving optical engine assembly converts the input optical signal into an input electrical signal, and transmits the input electrical signal to the electrical switching chip 102, to complete signal receiving.

It should be noted that the optical engine assembly 103 and the transmit-end optical fiber 201 may be independent of each other, or the transmit-end optical fiber 201 may be a part of the optical engine assembly 103. The optical engine assembly 103 and the light source pool fiber 204 may be independent of each other, or the light source pool fiber 204 may be a part of the optical engine assembly 103.

Figure 3:
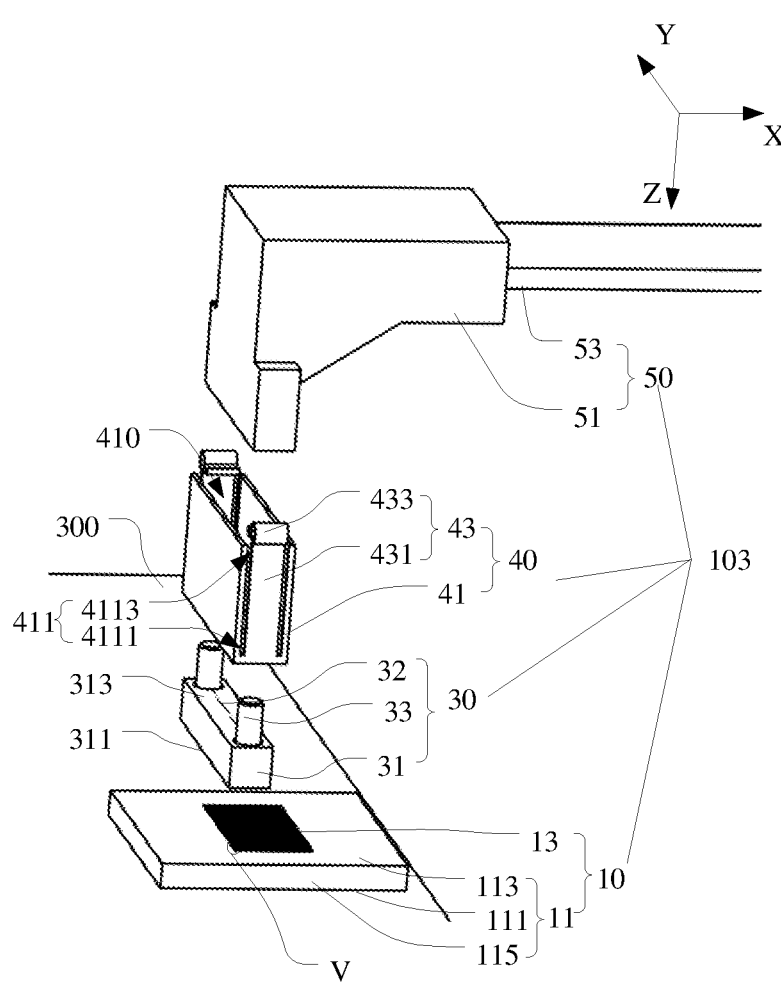
FIG. 3 is a schematic three-dimensional assembly diagram of an optical engine assembly of an optical interconnection system according to a first implementation of this application.
Figures 4, 5:
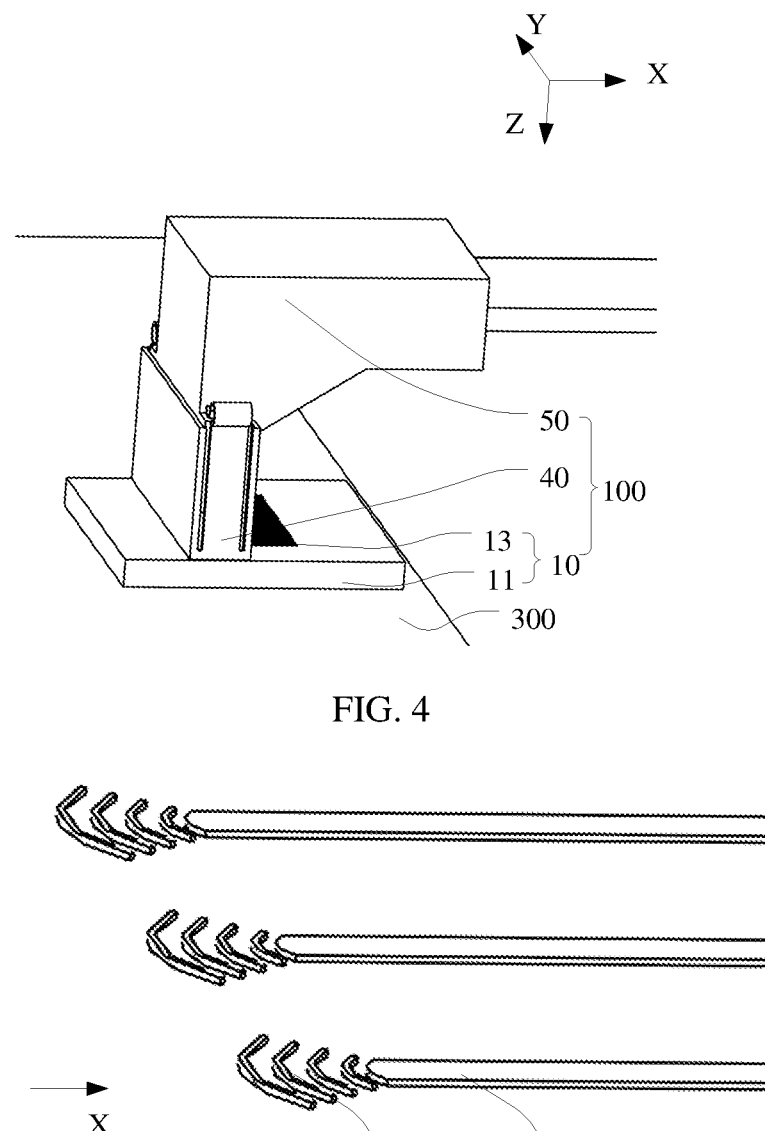
FIG. 4 is a schematic three-dimensional exploded view of the optical engine assembly shown in FIG. 3.
FIG. 5 is a schematic three-dimensional exploded view of a first optical conduction portion according to a first implementation of this application.

As shown in FIG. 3 and FIG. 4, the optical engine assembly 103 (the sending optical engine assembly and the receiving optical engine assembly) includes an optical engine (OE) 10, a coupling base 30, and a fiber array unit 50. The optical engine 10 is configured to implement conversion between an optical signal and an electrical signal. The optical signal includes an output optical signal and an input optical signal. The electrical signal includes an input electrical signal and an output electrical signal. The coupling base 30 is fastened on the optical engine 10, the coupling base 30 is pluggably connected to the fiber array unit 50, and the coupling base 30 is located between the optical engine 10 and the fiber array unit 50. An optical signal (for example, an input optical signal) that is input from the fiber array unit 50 passes through the coupling base 30 and reaches the optical engine 10, and/or an optical signal (for example, an output optical signal) that is output from the optical engine 10 passes through the coupling base 30 and reaches the fiber array unit 50. It should be noted that FIG. 2 shows only an example in which a fiber array unit 50 is disposed on one optical engine 10.

The fiber array unit 50 is pluggably connected to the coupling base 30, so that passive coupling between the fiber array unit 50 and the coupling base 30 is implemented, thereby increasing assembly efficiency of the optical engine assembly 100. In addition, if an optical fiber cut occurs in the fiber array unit 50, the faulty fiber array unit 50 may be removed and replaced with a new fiber array unit 50. The passive coupling is an assembly manner in which no light needs to pass through or no insertion loss of an optical path needs to be monitored during assembly of an optical element, but accurate localization is performed by using a mechanical part.

In this implementation, the electrical switching chip 102 (shown in FIG. 1 and FIG. 2) and the optical engine 10 are fastened on the substrate 300 through soldering or bonding, and the electrical switching chip 102 and the optical engine 10 are electrically connected by using the substrate 300. A direction in which the optical engine 10 and the fiber array unit 50 are stacked is a third direction (for example, a Z direction shown in FIG. 3 and FIG. 4). The third direction is different from a first direction, and the third direction is different from a second direction. It may be understood that a manner of disposing the electrical switching chip 102 and the optical engine 10 on the substrate 300 is not limited in this application.

Specifically, the optical engine 10 includes a core 11 and a first optical conduction portion 13. The core 11 is electrically connected to the electrical switching chip 102. The core 11 includes a first mounting surface 111, a second mounting surface 113, and a side surface 115. One end of the side surface 115 is connected to the first mounting surface 111, a second end of the side surface 115 is connected to the second mounting surface 113 fixedly, and the first mounting surface 111 is connected to the substrate 300 fixedly. A light guide surface of the first optical conduction portion 13 is located on the second mounting surface 113, and is configured to send or receive light (including an input optical signal and an output optical signal). The first mounting surface 111 and the second mounting surface 113 are disposed opposite to each other and in parallel. It may be understood that the first mounting surface 111 and the second mounting surface 113 may not be disposed in parallel.

In this implementation, optical coupling is implemented between the coupling base 30 and the optical engine 10 through grating coupling. As shown in FIG. 5, there are a plurality of first optical conduction portions 13, and each first optical conduction portion 13 includes an optical waveguide 131 and a refraction member 135. The optical waveguide 131 is built in the core 11 (shown in FIG. 4) and is configured to transmit an optical signal (an input optical signal or an output optical signal). The refraction member 135 is disposed in the core 11 (shown in FIG. 4) and is optically coupled to the optical waveguide 131, and the refraction member 135 is optically coupled to the coupling base 30. The refraction member 135 is configured to change a transmission direction of light, for example, change a transmission direction of the output optical signal that is output from the optical waveguide 131, so that the output optical signal is incident to the fiber array unit 50, or change a transmission direction of an input optical signal that is input from the fiber array unit 50, so that the input optical signal is incident to the optical waveguide 131. The optical waveguide 131 extends along the first direction (for example, an X direction shown in FIG. 4 and FIG. 5). In this implementation, the refraction member 135 is a grating, and the refraction member 135 changes the transmission direction of the output optical signal from the first direction to the third direction, or the refraction member 135 changes the transmission direction of the input optical signal from the third direction to the first direction, that is, the refraction member 135 bends an optical path by approximately 90 degrees. It may be understood that a structure of the first optical conduction portion 13 is not limited in this application, and the refraction member 135 may further be another optical device that can change a transmission direction of light, for example, a reflector.

A core 11 of the sending optical engine assembly may include a driver and a modulators. The driver is configured to convert an output electrical signal into a current or a voltage signal suitable for the modulator. The modulator is configured to: load, into the optical signal in the optical waveguide 131, the current or the voltage signal converted from the output electrical signal, and modulate the optical signal into an output optical signal. It can be learned that the sending optical engine assembly in this implementation has a function of converting an output electrical signal into an output optical signal. It may be understood that the core 11 of the sending optical engine assembly may further include another necessary or unnecessary device. Details are not described herein.

A core 11 of the receiving optical engine assembly may include an optoelectronic detector and a trans-impedance amplifier (TIA). The optoelectronic detector is configured to: detect an input optical signal and generate an input electrical signal. The trans-impedance amplifier is configured to: receive the input electrical signal generated by the optoelectronic detector, amplify the input electrical signal, and output the amplified input electrical signal. Generally, in an optical communication system, the optoelectronic detector and the trans-impedance amplifier are used cooperatively. The optoelectronic detector is configured to: convert a weak optical signal received by an optical interface into an electrical signal, where the generated electrical signal is a current signal. The trans-impedance amplifier amplifies the current signal to an extent to form a stable voltage signal. It can be learned that the receiving optical engine assembly in this implementation has functions of detecting an input optical signal and converting the input optical signal into an input electrical signal. It may be understood that the core 11 of the receiving optical engine assembly may further include another necessary or unnecessary device. Details are not described herein.

Figure 6A:
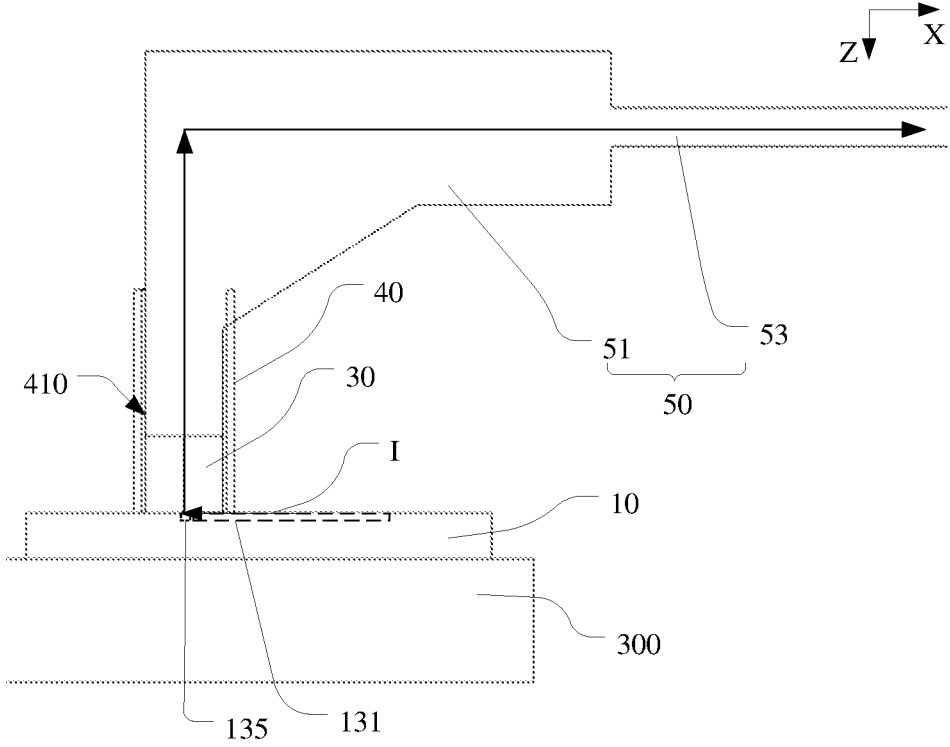
FIG. 6a is a schematic diagram of an optical path of an output optical signal of an optical interconnection system according to a first implementation of this application.

In the sending optical engine assembly, as shown in FIG. 6a, an output optical signal (a solid line I shown in FIG. 6a) emitted from the optical waveguide 131 is incident to the refraction member 135, and the refraction member 135 changes a transmission direction of the output optical signal from the first direction (an X direction shown in FIG. 6a) to the third direction (a Z direction shown in FIG. 6a), so that the output optical signal is transmitted from the optical engine 10 to the fiber array unit 50.

Figure 6B:
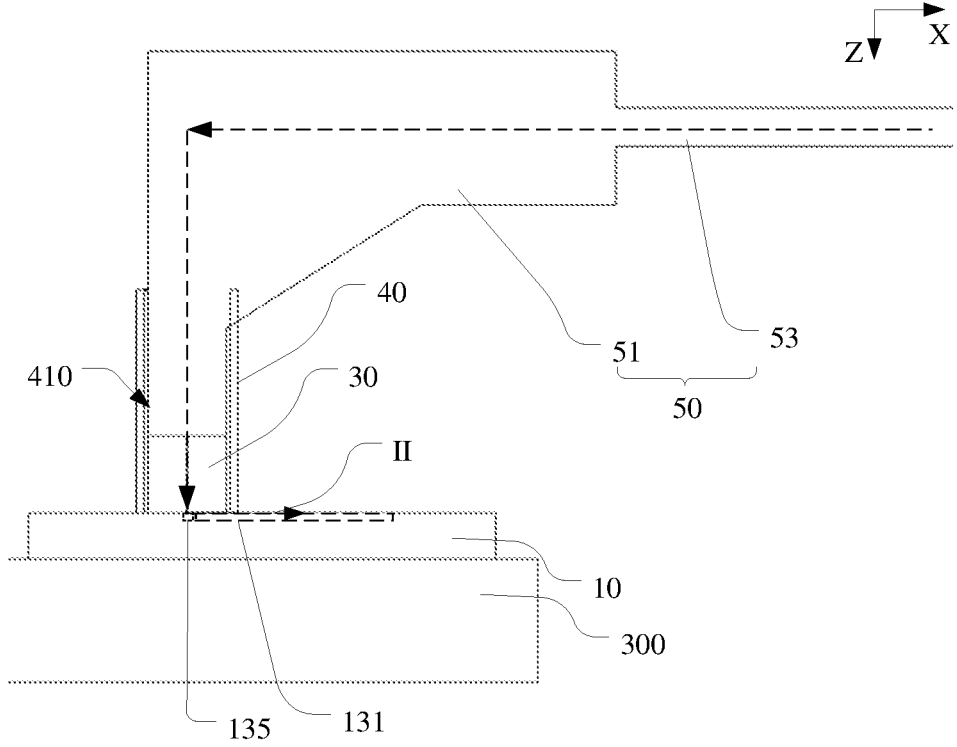
FIG. 6b is a schematic diagram of an optical path of an input optical signal in an optical interconnection system according to a first implementation of this application.

Similarly, in the receiving optical engine assembly, as shown in FIG. 6b, an input optical signal (a solid line II shown in FIG. 6b) that is input from the fiber array unit 50 is incident to the refraction member 135, and the refraction member 135 changes a transmission direction of the input optical signal from the third direction (a Z direction shown in FIG. 6b) to the first direction (an X direction shown in FIG. 6b), so that the input optical signal is incident to the optical waveguide 131.

Figure 7:
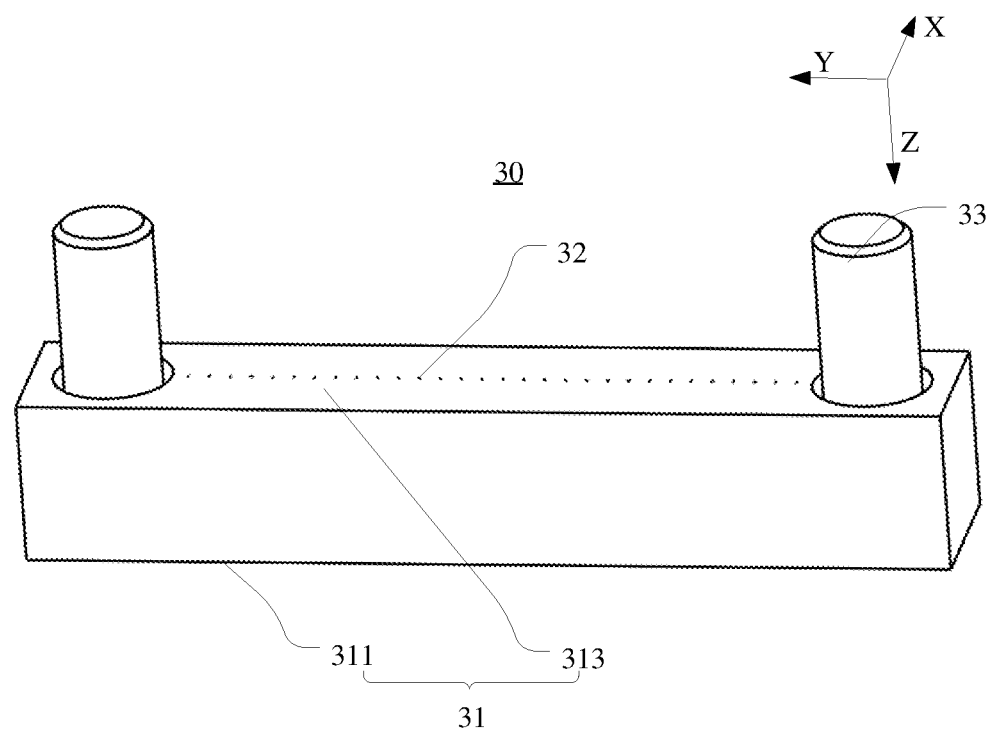
FIG. 7 is a schematic three-dimensional diagram of a coupling base according to a first implementation of this application.

As shown in FIG. 3 and FIG. 7, the coupling base 30 includes a base 31, a second optical conduction portion 32, and a first guide portion 33. The base 31 is fastened on a surface that is of the core 11 and that is away from the substrate 300. In other words, the base 31 is fastened on the second mounting surface 113 of the core 11. The base 31 and the core 11 are disposed in a stacked manner. In this implementation, the base 31 is a transparent structure, for example, a transparent structure made of glass. The base 31 includes a first surface 311 and a second surface 313 that are disposed opposite to each other. The first surface 311 is connected to the second mounting surface 113 fixedly by using an adhesive, and the second surface 313 is located on a surface that is of the base 31 and that is away from the optical engine 10.

The second optical conduction portion 32 (a dot-shaped object shown in FIG. 7) is built in the base 31. In other words, the second optical conduction portion 32 is wrapped by the base 31. The second optical conduction portion 32 extends along the third direction (a Z direction shown in FIG. 7), the second optical conduction portion 32 extends from the first surface 311 to the second surface 313, one end face of the second optical conduction portion 32 is located on the first surface 311, and the other end face of the second optical conduction portion 32 is located on the second surface 313. There are a plurality of second optical conduction portions 32, so that a plurality of optical channels are formed on the coupling base 30. The plurality of second optical conduction portions 32 are arranged along the second direction (a Y direction shown in FIG. 7) to form an array. An optical path interconnection is performed on each second optical conduction portion 32 and one first optical conduction portion 13, to implement optical coupling. An input optical signal can be incident to the first optical conduction portion 13 by using the second optical conduction portion 32 built in the base 31, and an output optical signal that is output from the first optical conduction portion 13 can be output to the fiber array unit 50 by using the second optical conduction portion 32 built in the base 31.

The coupling base 30 performs optical conduction in a manner of building the second optical conduction portion 32 in the base 31 instead of providing an air gap. When the coupling base 30 is bonded to the optical engine 10 by using an adhesive a possibility that the adhesive pollutes an optical path is reduced. The second optical conduction portion 32 includes an optical waveguide or an optical fiber. The optical waveguide can be formed in the base 31 through laser direct writing or ion injection. A through hole may be provided in the base 31, and the through hole is formed through the first surface 311 and the second surface 313. A bare optical fiber can be fastened in the through hole in the base 31 by using an adhesive, and an optical side face is processed by using a grinding and polishing process. It may be understood that a structure of the second optical conduction portion 32 is not limited in this application, provided that the second optical conduction portion 32 can transmit light.

The first guide portion 33 is disposed on the second surface 313 of the base 31, that is, the first guide portion 33 is disposed on a surface that is of the base 31 and that is away from the optical engine 10. The first guide portion 33 and the fiber array unit 50 are pluggably connected together, so that the fiber array unit 50 is attached to the second surface 313 of the base 31. The first optical conduction portion 13 (the optical waveguide 131 and the refraction member 135), the second optical conduction portion 32, and the fiber array unit 50 form an optical path that can transmit light (an input optical signal and an output optical signal).

It may be understood that, in some implementations, the base 31 includes a transparent area and a non-transparent area that are connected to each other. In other words, a local area of the base 31 may be a transparent area, the second optical conduction portion 32 is disposed in the transparent area, and the first guide portion 33 may be disposed in the non-transparent area or the transparent area.

Figure 8:
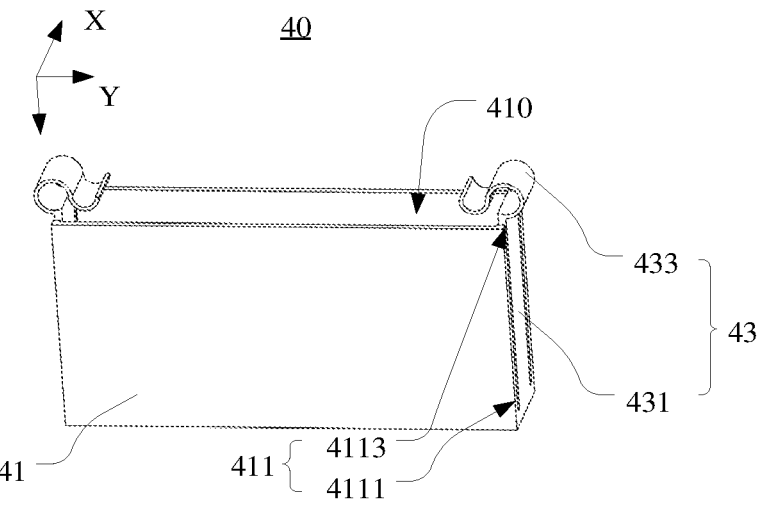
FIG. 8 is a schematic three-dimensional diagram of a limiting part according to a first implementation of this application.

As shown in FIG. 3, FIG. 4, and FIG. 8, the optical engine assembly 103 further includes a limiting part 40. The limiting part 40 is configured to limit a relative location between the coupling base 30 and the fiber array unit 50, to reduce a possibility of motion of the coupling base 30 relative to the fiber array unit 50, thereby preventing the fiber array unit 50 from being detached from the coupling base 30.

The limiting part 40 includes a main body 41 and an elastic arm 43 disposed in a manner of being connected to the main body 41. The main body 41 is connected to the coupling base 30 fixedly, the main body 41 is attached to the fiber array unit 50, and the elastic arm 43 abuts against the fiber array unit 50, so that the fiber array unit 50 is limited on the coupling base 30. A location of the fiber array unit 50 is limited on the coupling base 30 by using elastic force of the elastic arm 43, so that connection stability between the coupling base 30 and the fiber array unit 50 is enhanced, and assembly difficulty of the optical engine assembly 103 is further reduced.

The main body 41 has a hollow cavity 410. The coupling base 30 is accommodated in the hollow cavity 410 fixedly, the fiber array unit 50 penetrates the hollow cavity 410, and a side wall of the hollow cavity 410 is attached to the base 31 of the coupling base 30 and the fiber array unit 50. Because the coupling base 30 is enclosed in the main body 41, one end that is of the fiber array unit 50 and that is connected to the coupling base 30 is enclosed in the main body 41, thereby reducing a possibility that the coupling base 30 and the fiber array unit 50 are polluted during assembly and use.

In this implementation, the main body 41 is bonded to a peripheral wall of the base 31 of the coupling base 30 by using an adhesive, so that the main body 41 is sealedly connected to the coupling base 30, thereby reducing a possibility that an impurity such as dust enters the main body 41 to pollute an optical path. It may be understood that a manner of connecting the main body 41 and the coupling base 30 is not limited. For example, the side wall of the main body 41 may be clamped to the base 31 of the coupling base 30.

The main body 41 is further provided with a groove 411, the groove 411 is formed through the side wall of the hollow cavity 410 of the main body 41, and the groove 411 extends in the third direction (a Z direction shown in FIG. 8). Because the main body 41 is provided with the groove 411, a deformation capability of the main body 41 is enhanced, thereby facilitating plugging and removal of the fiber array unit 50. The groove 411 includes a first end 4111 and a second end 4113 that are disposed opposite to each other along a direction in which the base 31 and the core 11 are stacked. Compared with the second end 4113, the first end 4111 is disposed closer to the optical engine 10 (shown in FIG. 3). The elastic arm 43 is fastened on a side wall of the first end 4111 of the groove 411 and extends along the groove 411.

A quantity of elastic arms 43 is two, and the two elastic arms 43 are disposed on the main body 41 at an interval along the second direction (a Y direction shown in FIG. 8). The fiber array unit 50 is clamped between the two elastic arms 43, to enhance connection stability between the fiber array unit 50 and the coupling base 30. The elastic arm 43 may move out of the main body 41 under force, to increase a diameter of an opening between the two elastic arms 43, thereby facilitating the fiber array unit 50 entering the hollow cavity 410, and improving assembly convenience of the optical interconnection system 1000.

It may be understood that the quantity of elastic arms 43 is not limited in this application, and there may be one, three, or more elastic arms 43.

The elastic arm 43 includes a connecting portion 431 and an abutting portion 433 that are connected to each other, and one end that is of the connecting portion 431 and that is away from the abutting portion 433 is connected to the main body 41 fixedly. The abutting portion 43 elastically abuts against the fiber array unit 50, so that the limiting part 40 limits the fiber array unit 50 on the coupling base 30, thereby reducing a possibility that the fiber array unit 50 moves relative to the coupling base 30, and preventing the fiber array unit 50 from being detached from the coupling base 30. The connecting portion 431 is fastened on the side wall of the first end 4111 of the groove 411 and extends along the groove 411. The abutting portion 433 is exposed from the second end 4113 of the groove 411 and extends towards a direction in which the fiber array unit 50 is located, to enhance clamping force for clamping the fiber array unit 50 by the elastic arm 43.

In this implementation, the abutting portion 433 is approximately of an S-shaped bending structure, to enhance an elastic deformation capability of the elastic arm 43. It may be understood that a structure of the elastic arm 43 is not limited in this application, for example, a square structure. A location that is on the main body 41 and at which the elastic arm 43 is disposed is not limited in this application. For example, the groove 411 may be omitted, and the elastic arm 43 may be directly disposed at an end that is of the main body 41 and that is away from the optical engine 10.

In this implementation, the limiting part 40 is made of a metal material that is easy to form, the elastic arm 43 and the main body 41 are integrated, the main body 41 is bonded to the optical engine 10 by using an adhesive, and the elastic arms 43 on two sides may be open and closed by using a customized fixture. When the fiber array unit 50 is plugged and removed, the elastic arm 43 moves out of the main body 41 under force, and is closed after the fiber array unit 50 is inserted into the main body 41 and is pluggably connected to the coupling base 30, to fasten and press the fiber array unit 50. It may be understood that materials of the elastic arm 43 and the main body 41 may alternatively be different.

Figure 9:
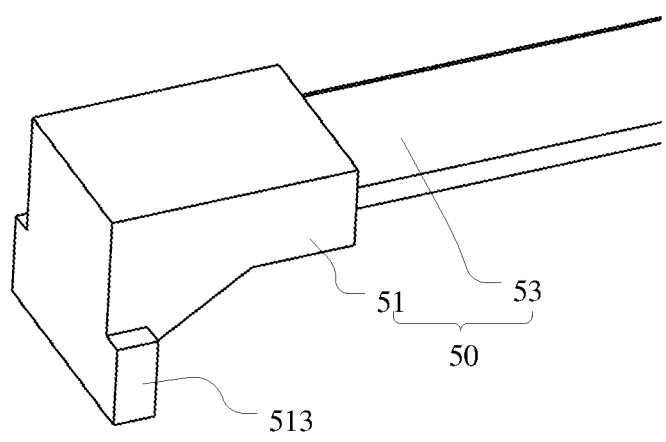
FIG. 9 is a schematic three-dimensional diagram of a fiber array unit according to a first implementation of this application.
Figure 10:
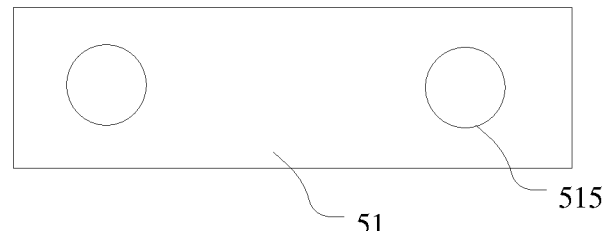
FIG. 10 is a bottom view of a light guide base of a fiber array unit according to a first implementation of this application.

As shown in FIG. 6a and FIG. 9, the fiber array unit 50 includes a light guide base 51 and an optical fiber 53 fastened on the light guide base 51. The light guide base 51 is accommodated in the hollow cavity 410 of the limiting part 40. The light guide base 51, the base 31, and the core 11 are sequentially disposed in a stacked manner. A second guide portion 515 (shown in FIG. 10) is disposed on a surface that is of the light guide base 51 and that faces the optical engine 10. The second guide portion 515 and the first guide portion 33 are pluggably connected together, and are configured to guide motion of the light guide base 51 relative to the coupling base 30, to implement guiding and localization when the fiber array unit 50 is pluggably connected to the coupling base 30 or the fiber array unit 50 is removed from the coupling base 30.

In this implementation, the first guide portion 33 (shown in FIG. 7) is a guide rod, the base 31 is provided with a through hole (not shown in the figure) that is formed through the first surface 311 and the second surface 313, a guide rod (for example, a precise guide rod) is fastened in the through hole, the second guide portion 515 is a guide hole, and the guide rod is accommodated in the guide hole, so that precise alignment and pluggable localization between the fiber array unit 50 and the coupling base 30 are implemented. The guide rod includes, but is not limited to, a material such as metal, glass, or ceramic, and a top side surface that is of the guide rod and that is away from the base 31 has a chamfer, to facilitate alignment and guiding of plugging and removal assembly.

It may be understood that one of the first guide portion 33 and the second guide portion 515 is a guide rod, the other of the first guide portion 33 and the second guide portion 515 is a guide hole, and the guide rod is pluggably connected to the guide hole. For example, in another implementation, the first guide portion 33 is a guide hole, and the second guide portion 515 is a guide rod.

It may be understood that a manner of pluggably connecting the fiber array unit 50 and the coupling base 30 is not limited in this application. For example, the coupling base is provided with a chute, a sliding block is disposed on a side wall of the fiber array unit 50, and the sliding block is slidably disposed in the chute, to implement a pluggable connection between the fiber array unit 50 and the coupling base 30.

A V-shaped groove or a fastening hole may be provided on the light guide base 51, and the optical fiber 53 is fastened to the V-shaped groove or the fastening hole by using an adhesive. An optical channel formed by the first optical conduction portion 13 of the optical engine 10, an optical channel formed by the second optical conduction portion 32, and an optical channel formed by the optical fiber 53 are aligned to form an optical path that can transmit light. A surface that is of the light guide base 51 and that faces the base 31 is processed by using a grinding and polishing process. There are a plurality of optical fibers 53. An end face of the optical fiber 53 is optically ground, and the end face of the optical fiber 53 is optically coupled to the second optical conduction portion 32 on the base 31 of the coupling base 30, to receive an input optical signal and send an output optical signal.

The second guide portion 515 is disposed on the surface that is of the light guide base 51 and that faces the optical engine 10, and the second guide portion 515 and the first guide portion 33 of the coupling base 30 may implement precise alignment and limiting, to ensure optical path alignment and coupling during plugging and removal of the fiber array unit 50. An optical fiber connector (such as an MT, an LC, a DLC, or an SC) may be disposed on the other end that is of the optical fiber 53 and that is away from the base 31, to fasten an external optical fiber. The optical fiber 53 may also be connected to the external optical fiber in a splicing manner. In this implementation, an optical fiber in the optical fiber 53 of the fiber array unit 50 is of a bending structure, and a bending angle of the optical fiber 53 is approximately 90°. It may be understood that, in some implementations, the optical fiber 53 may be of a linear structure.

In a process of assembling the fiber array unit 50 into the coupling base 30, no light needs to pass through and no insertion loss of an optical path needs to be monitored, but quick localization is performed through a pluggable connection between the second guide portion 515 and the first guide portion 33, so that a preset mounting area of the fiber array unit 50 is attached to a preset mounting area of the coupling base 30, that is, optical coupling is implemented between the fiber array unit 50 and the optical engine 10 in a passive coupling manner. Therefore, assembly efficiency of assembling the fiber array unit 50 into the optical engine 10 is increased.

An abutting step 513 is convexly disposed on an outer wall of the light guide base 51. When the fiber array unit 50 is inserted into the limiting part 40 and is pluggably connected to the coupling base 30, the abutting portion 433 of the elastic arm 43 abuts against the abutting step 513. The abutting step 513 is configured to limit motion of the light guide base 51 relative to the main body 41, to reduce an optical loss during transmission of an optical signal, and further improve reliability of the optical engine assembly 103. In this implementation, the abutting step 513 extends along a third direction, and is configured to limit motion of the light guide base 51 relative to the main body 41 along the third direction.

The following briefly describes an assembly procedure of the optical interconnection system 1000.

Figure 11:
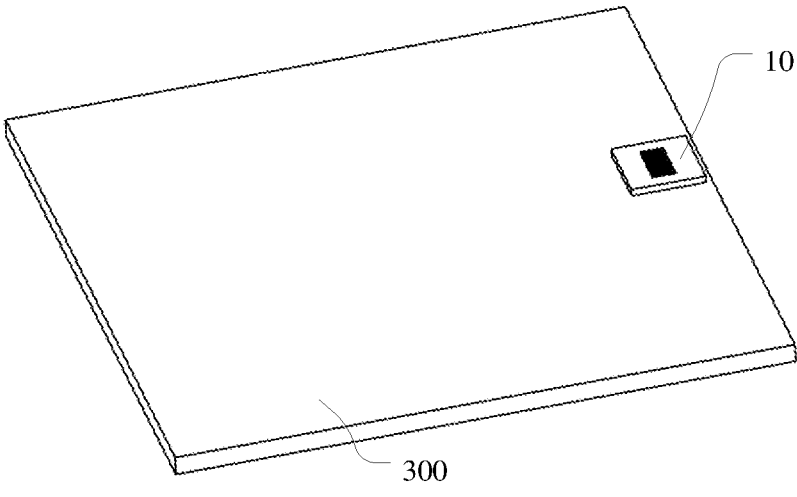
FIG. 11 is a schematic diagram of disposing an optical engine on a substrate according to a first implementation of this application.

As shown in FIG. 11, the optical engine 10 is disposed on the substrate 300. The optical engine 10 is fastened to the substrate 300 by using solder or an adhesive. An electrical connection between the optical engine 10 and the substrate 300 may be performed through binding with a gold wire, for example, by using a high-temperature reflow soldering process. It may be understood that a pad may be disposed on the second mounting surface 113 on the optical engine 10, and an electrical connection between the optical engine 10 and the substrate 300 may alternatively be implemented by performing soldering between the pad on the optical engine 10 and the substrate 300. In some implementations, the optical engine 10 and the substrate 300 may further be fastened and connected by using a pluggable electrical connector.

Figure 12:
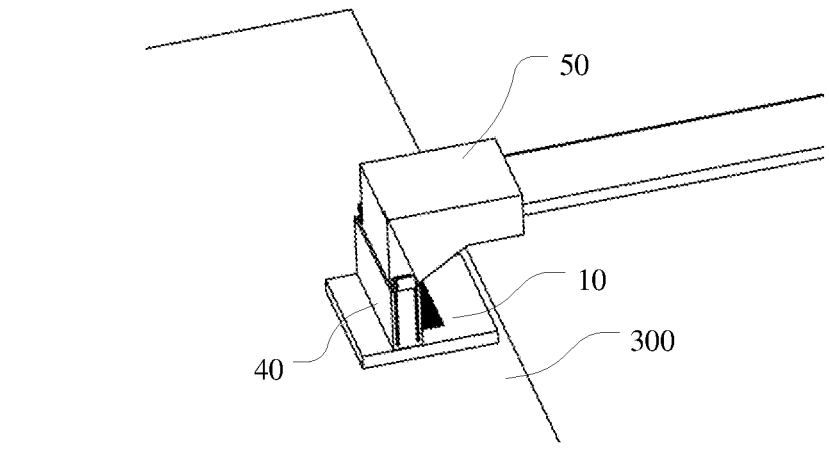
FIG. 12 is a schematic diagram of pre-interconnecting a coupling base, a limiting part, and a fiber array unit according to a first implementation of this application.

As shown in FIG. 12, the coupling base 30 (shown in FIG. 6a), the limiting part 40, and the fiber array unit 50 are assembled together, and active coupling is implemented between the coupling base 30 and the optical engine 10. For example, the optical engine 10 generally includes one or more pairs of straight-through waveguides coupled to the fiber array unit 50, and one or more pairs of corresponding channels are disposed in the fiber array unit 50 corresponding to the straight-through waveguides. One of each pair of channels is connected to an external light source, and the other is connected to an external optical power meter. During coupling, a link insertion loss is monitored online, and glue dispensing and curing are performed between the coupling base 30 and the optical engine 10 when the insertion loss is the smallest, so that alignment of a channel of the first optical conduction portion 13 of the optical engine 10, a channel of the second optical conduction portion 32, and a channel of the fiber array unit 50 is implemented. After the coupling base 30 and the optical engine 10 are cured, the fiber array unit 50 is removed from the coupling base 30. An optical engine 10, a coupling base 30, and a limiting part 40 of another optical engine assembly 103 (shown in FIG. 2) are disposed on the substrate 300 in a similar manner.

Figure 13:
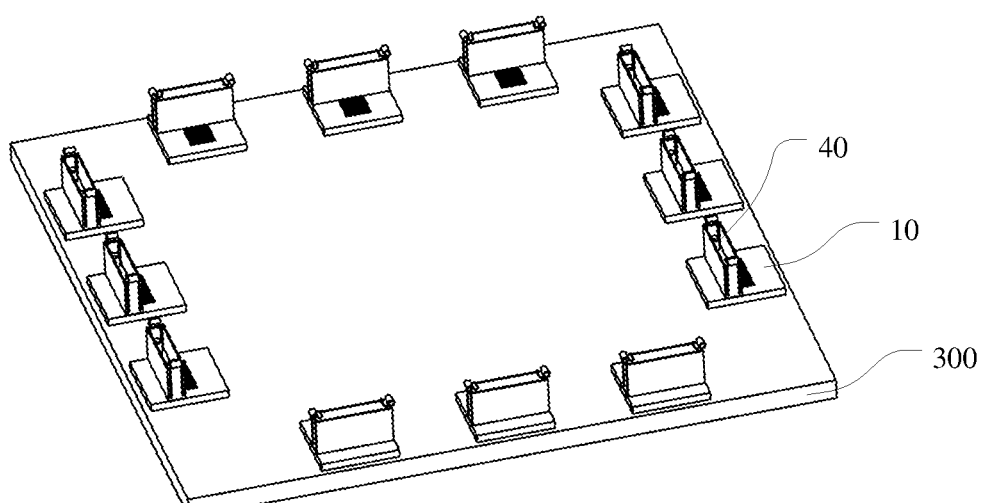
FIG. 13 is a schematic diagram of an optical interconnection system after a fiber array unit is removed according to a first implementation of this application.

After the fiber array unit 50 is removed (as shown in FIG. 13), the optical engine 10, the coupling base 30, the limiting part 40, and the substrate 300 form a pre-fabricated body, and the pre-fabricated body is electrically connected to the system circuit board 2000 of the network device 3000 through reflow soldering.

After other parts are assembled, the fiber array unit 50 is passively inserted into the limiting part 40. After the fiber array unit 50 is passively aligned with the coupling base 30, assembly is completed (as shown in FIG. 1). If an optical fiber cut occurs again after the fiber array unit 50 is inserted, remove and replace the fiber array unit 50.

During an electrical connection between the substrate and the optical engine and an electrical connection between the substrate and the system circuit board, radio frequency performance and a loss may need to be ensured through reflow soldering (a soldering temperature is up to 260° C.). However, the optical fiber and the optical fiber connector are not resistant to a high temperature, and are easily damaged.

However, in this application, before the pre-fabricated body is soldered to the system circuit board 2000 of the network device 3000, a pre-interconnection among the optical array unit 50, the coupling base 30, and the optical engine 10 (that is, optical path alignment of the first optical conduction portion 13 of the optical engine 10, the second optical conduction portion 32, and the fiber array unit 50) is completed. Equivalently, a pre-interconnection among the optical engine 10, the coupling base 30, and the fiber array unit 50 is completed at a chip level. After the pre-interconnection among the optical array unit 50, the coupling base 30, and the optical engine 10 is completed, the fiber array unit 50 is removed, and then the substrate 300 of the pre-fabricated body is soldered to the system circuit board 2000 of the network device 3000. After the pre-fabricated body is soldered onto the system circuit board 2000 of the network device 3000, the optical array unit 50 and the coupling base 30 are pluggably connected together. In this way, a possibility that the fiber array unit 50 is damaged due to a high temperature generated when the optical interconnection system 100 is soldered to the system circuit board 2000 of the network device 3000 is reduced, thereby helping reduce a problem of incompatibility between an electrical coupling process and an optical coupling process and reduce coupling difficulty.

Figure 14:
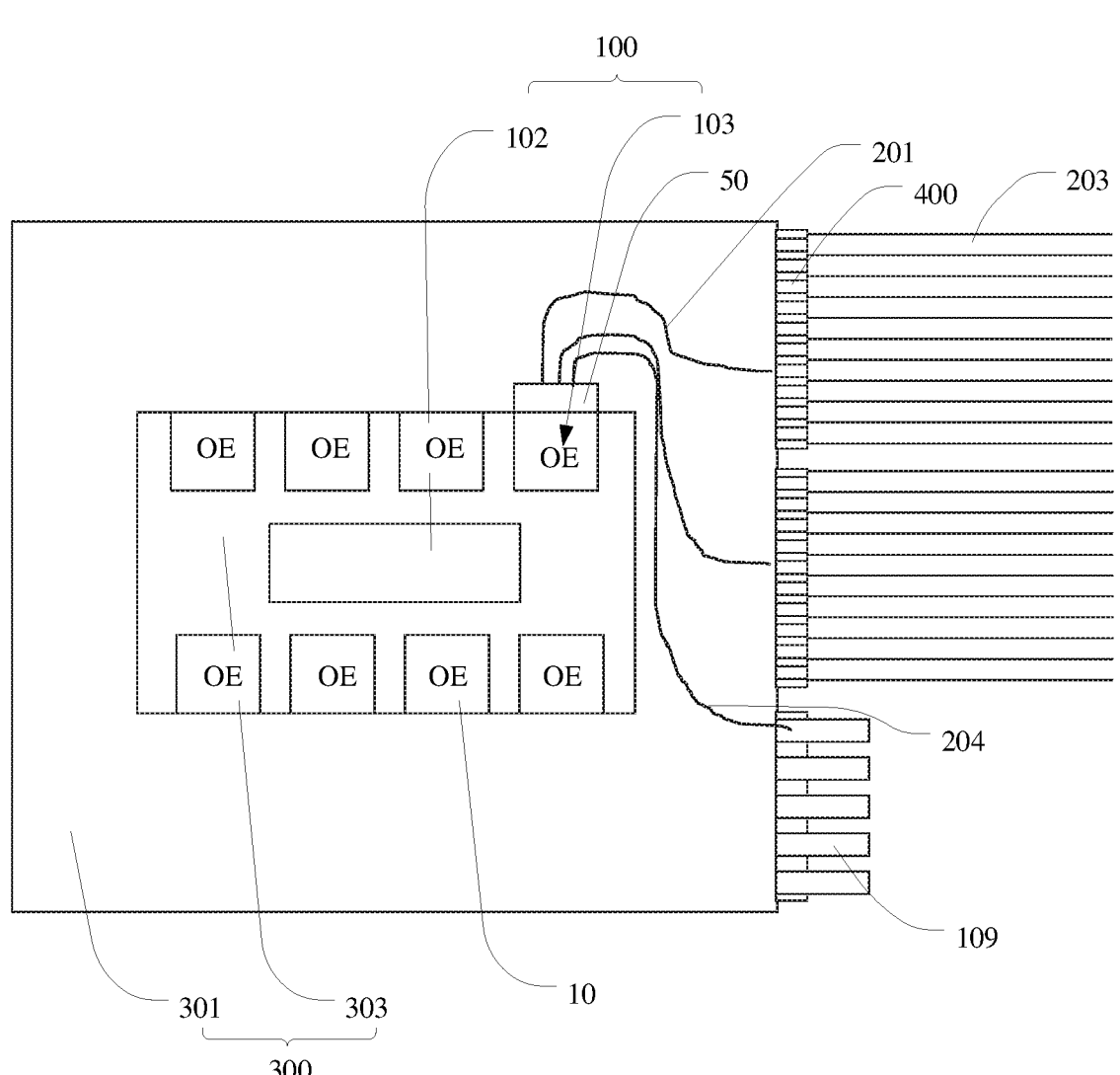
FIG. 14 is a schematic diagram of a plane of an optical interconnection system according to a second implementation of this application.
Figures 15, 16:
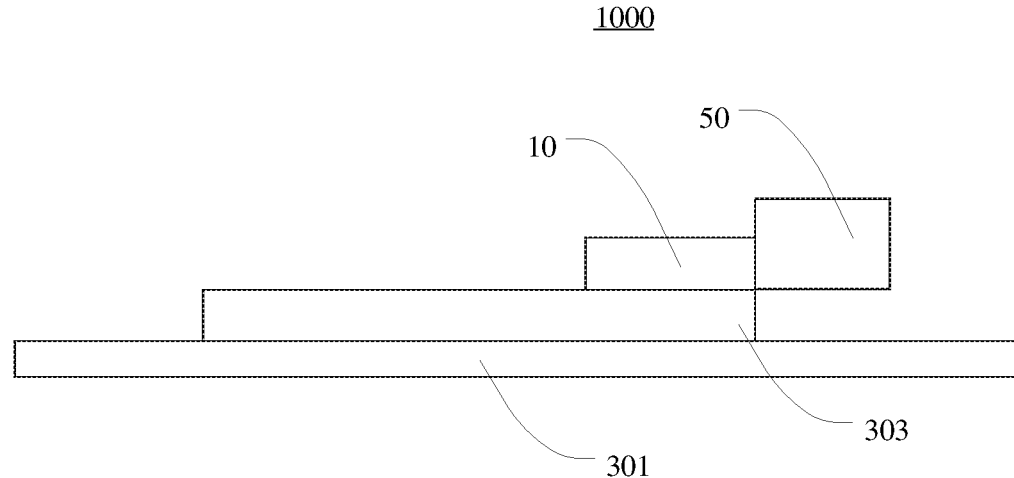
FIG. 15 is a schematic diagram of a side surface of an optical interconnection system according to a second implementation of this application.
FIG. 16 is a schematic three-dimensional exploded view of an optical interconnection system according to a third implementation of this application.

As shown in FIG. 14 and FIG. 15, a structure of an optical interconnection system 1000 provided in a second implementation of this application is approximately the same as the structure of the optical interconnection system 1000 provided in the first implementation. A difference lies in that a substrate 300 includes a first substrate 301 and a second substrate 303 that are disposed in a stacked manner, an electrical switching chip 102 is disposed on a surface that is of the second substrate 303 and that is away from the first substrate 301, and an optical engine 10 is disposed on a surface that is of the second substrate 303 and that is away from the first substrate 301. The optical engine 10 is configured to: convert an output electrical signal into an output optical signal, detect an input optical signal, and convert the input optical signal into an input electrical signal. In this implementation, the electrical switching chip 102 is electrically connected to the second substrate 303, and the optical engine 10 is electrically connected to the second substrate 303. The first substrate 301 is a board of a network device, and the second substrate 303 is an optical/electrical carrier board. It may be understood that the first substrate 301 is not limited to the board of the network device, and the second substrate 303 is not limited to the optical/electrical carrier board, provided that the first substrate 301 can carry the second substrate 303, and the second substrate 303 can carry an optical engine assembly 103 and the electrical switching chip 102.

Specifically, an optical fiber interface 400 and an external light source pool 109 are disposed on the first substrate 301, the optical fiber interface 400 is connected to the optical engine assembly 103 by using an optical fiber 201, the optical fiber interface 400 is connected to an external optical fiber 203, and the external light source pool 109 is connected to a fiber array unit 50 by using a light source pool fiber 204.

An unmodulated laser emitted from the external light source pool 109 is transmitted to the fiber array unit 50 through the light source pool fiber 204, and is coupled to a first optical conduction portion (not shown in the figure) of the optical engine 10. The output optical signal that is obtained through modulation by the optical engine 10 is coupled to the optical fiber array 50, is connected to the optical fiber interface 400 through the optical fiber 201, and is further transmitted to the external optical fiber 203, to complete sending of the output optical signal.

An input optical signal transmitted from the external optical fiber 203 is transmitted to the optical fiber 201 through the optical fiber interface 400, and is then coupled to the optical engine 10 by using the fiber array unit 50. Optical detection and optical-to-electrical conversion are implemented in the optical engine 10, to complete receiving of the input optical signal.

In the second implementation, the electrical switching chip 102 and the optical engine assembly 103 are disposed on the second substrate 303, to form a whole, thereby facilitating assembly and disassembly of the optical interconnection system 1000. In addition, the optical engine 10 integrates functions of converting an output electrical signal into an output optical signal, detecting an input optical signal, and converting the input optical signal into an input electrical signal. This helps simplify a structure of an optical communication component 100, and further reduce assembly difficulty and cabling difficulty of the optical interconnection system 1000.

Figure 17:
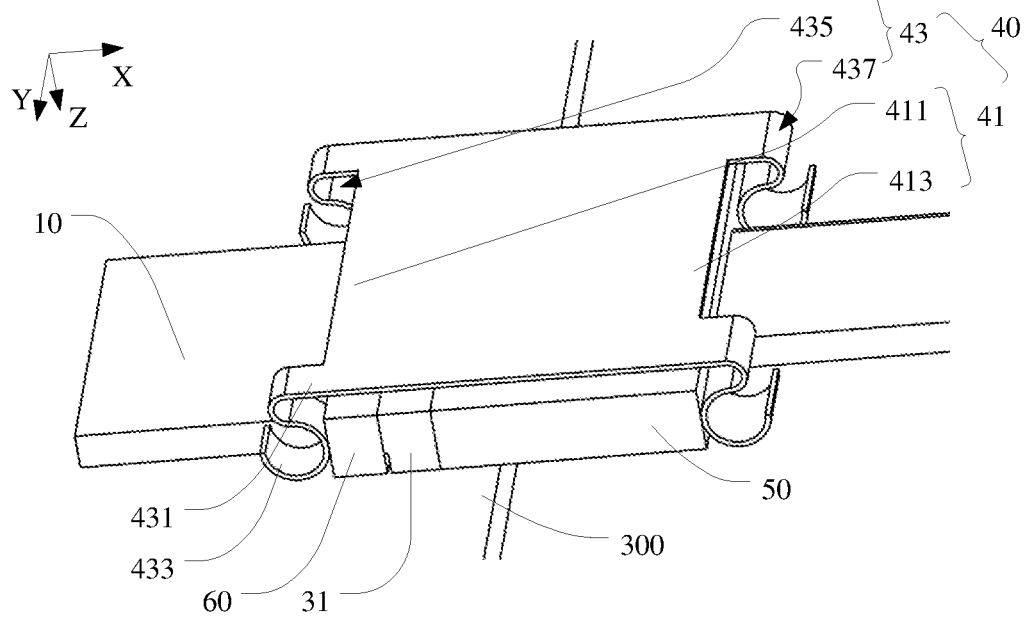
FIG. 17 is a schematic three-dimensional assembly diagram of an optical interconnection system according to a third implementation of this application.

As shown in FIG. 16 and FIG. 17, a difference between an optical engine assembly 103 provided in a third implementation of this application and the optical engine assembly 103 provided in the first implementation lies in that optical coupling is implemented between a fiber array unit 50 and an optical engine 10 in an edge coupling manner.

More specifically, the optical engine 10 includes a core 11 and a first optical conduction portion 13 built in the core 11. The core 11 includes a first mounting surface 111, a second mounting surface 113, and a side surface 115. The first mounting surface 111 and the second mounting surface 113 are disposed opposite to each other, and the side surface 115 is connected between the first mounting surface 111 and the second mounting surface 113. The first mounting surface 111 is fastened on a substrate 300. The first optical conduction portion 13 includes an optical waveguide (not shown in the figure). A light guide surface of the optical waveguide of the first optical conduction portion 13 is located on the side surface 115 of the core 11, and is configured to transmit light.

Figure 18:
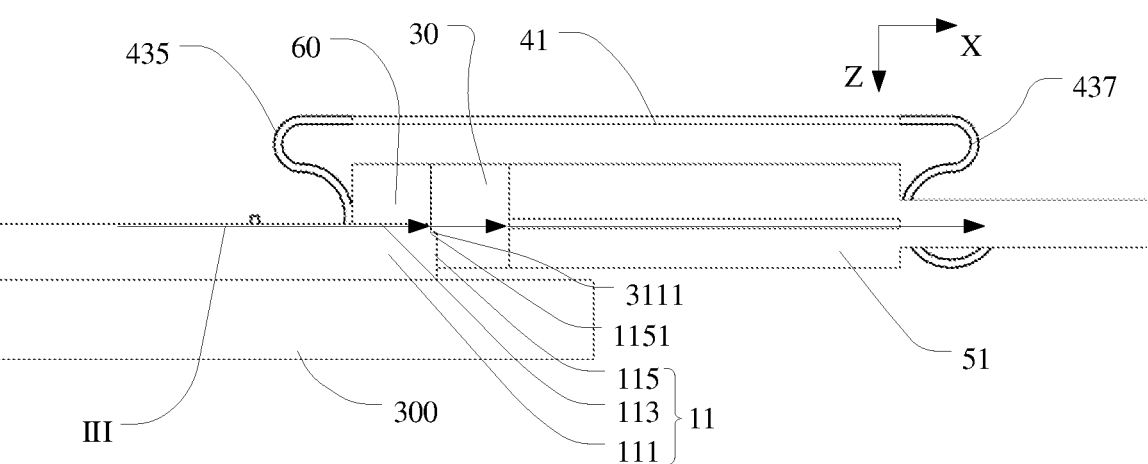
FIG. 18 is a schematic diagram of a side surface of an optical interconnection system according to a third implementation of this application.
Figure 19:
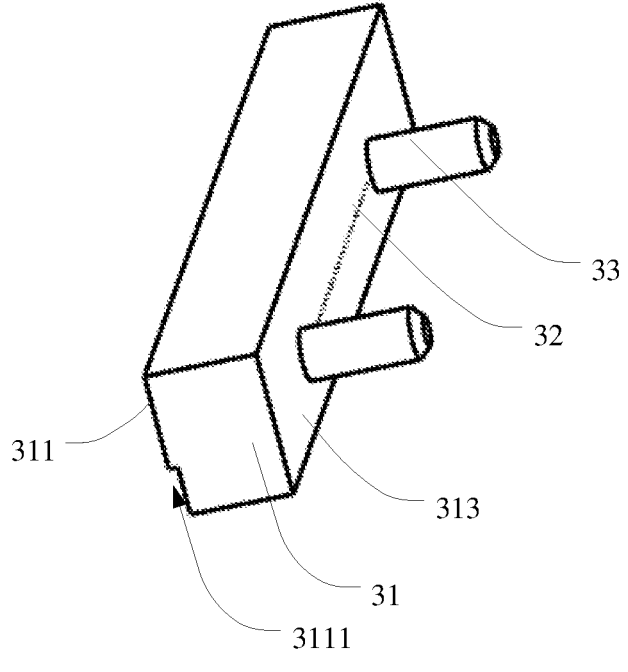
FIG. 19 is a schematic three-dimensional diagram of a coupling base according to a third implementation of this application.
Figure 20:
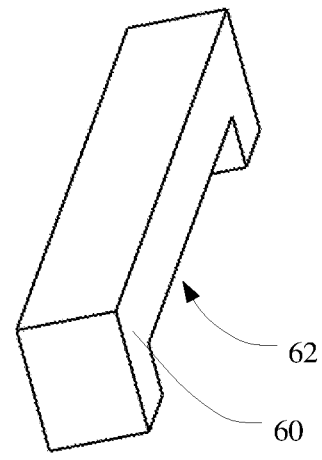
FIG. 20 is a schematic three-dimensional diagram of a reinforcing pad according to a third implementation of this application.

A step 1151 (shown in FIG. 18) is formed on the side surface 115 because an end face processing process of the optical waveguide and a splitting process of the first optical conduction portion 13 are inconsistent. As shown in FIG. 19, a coupling base 30 includes a base 31, a second optical conduction portion 32, and a second guide portion 33. The base 31 includes a first surface 311 and a second surface 313 that are disposed opposite to each other. A fitting step 3111 is disposed on the first surface 311, and the fitting step 3111 is connected to the step 1151 (shown in FIG. 18) of the optical engine 10 in a fitting manner, to reduce coupling difficulty and improve bonding reliability. The second optical conduction portion 32 is built in the base 31, and the second optical conduction portion 32 is optically coupled to the light guide surface of the first optical conduction portion 13. The second guide portion 33 is convexly disposed on the second surface 313, that is, the second guide portion 33 is convexly disposed on a surface that is of the base 31 and that is away from the optical engine 10.

In this implementation, the coupling base 30 and the fiber array unit 50 are arranged in a first direction (an X direction shown in FIG. 17), and the optical engine 10 and the substrate 300 are arranged in a stacked manner in a third direction (a Z direction shown in FIG. 17).

Sending of an output optical signal (a solid line III shown in FIG. 18) is used as an example. The output optical signal passes through the first optical conduction portion 13 and the coupling base 30 and is then output from the fiber array unit 50. A transmission direction of the output optical signal is along the first direction. A transmission direction of light in the first optical conduction portion 13 and the second optical conduction portion 32 is parallel to an arrangement direction of the coupling base 31 and the fiber array unit 50, and an optical path formed by the second optical conduction portion 32, the coupling base 30, and the fiber array unit 50 is not bent, so that an optical loss on the optical path can be reduced.

As shown in FIG. 16, FIG. 17, FIG. 18, and FIG. 20, the optical engine assembly 103 further includes a reinforcing pad 60. The reinforcing pad 60 is fastened on the core 11 of the optical engine 10, and the reinforcing pad 60 is fastened on the first surface 311 of the base 31, that is, the reinforcing pad 60 is fastened on a surface that is of the base 31 and that is away from the first guide portion 33. The optical engine 10 is located between the reinforcing pad 60 and the substrate 300.

Figure 21:
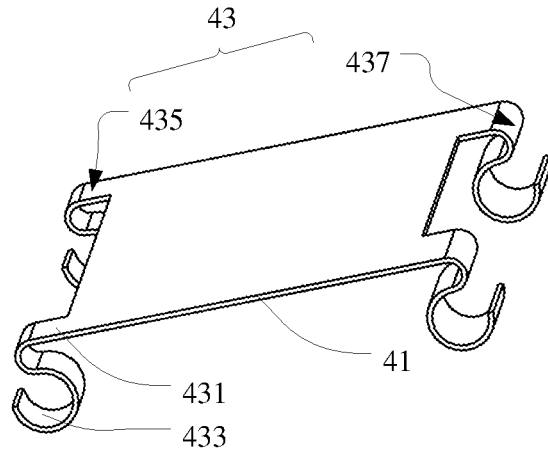
FIG. 21 is a schematic three-dimensional diagram of a reinforcing pad according to a third implementation of this application.

In this implementation, as shown in FIG. 17 and FIG. 21, a limiting part 40 is a metal spring. The limiting part 40 includes a main body 41 and an elastic arm 43 disposed in a manner of being connected to the main body 41. The elastic arm 43 abuts against the fiber array unit 50, so that the limiting part 40 limits the fiber array unit 50 on the coupling base 30, thereby preventing the fiber array unit 50 from being detached from the coupling base 30.

The main body 41 is of a sheet structure. The main body 41 includes a first end 411 and a second end 413 that are disposed opposite to each other in a direction (an X direction shown in FIG. 17) in which the base 31 and the core 11 are stacked. The first end 411 of the main body 41 is disposed close to the core 11. The elastic arm 43 includes a first elastic arm 435 and a second elastic arm 437. Both the first elastic arm 435 and the second elastic arm 437 include a connecting portion 431 and an abutting portion 433, and the connecting portion 431 of the first elastic arm 435 is connected to the first end 411 of the main body 41 fixedly. The connecting portion 431 of the second elastic arm 437 is connected to the second end 413 of the main body 41 fixedly. The main body 41, the first elastic arm 435, and the second elastic arm 437 jointly enclose clamping space. The reinforcing pad 60, the coupling base 30, and the fiber array unit 50 are sequentially arranged in the clamping space. The abutting portion 433 of the first elastic arm 435 abuts against the base 31 of the coupling base 30 by using the reinforcing pad 60, and the abutting portion 433 of the second elastic arm 437 abuts against the fiber array unit 50, so that the limiting part 40 limits the fiber array unit 50 on the coupling base 30.

In this implementation, the first elastic arm 435 and the second elastic arm 437 are arranged on the main body 41 at an interval along the first direction. A quantity of first elastic arms 435 is two, and a quantity of second elastic arms 437 is two. The two first elastic arms 435 are arranged on the first end 411 of the main body 41 at an interval along a second direction, and the two second elastic arms 437 are arranged on the second end 413 of the main body 41 at an interval along the second direction. The optical engine 10 is clamped by the two first elastic arms 435, and the optical engine 10 is located between the two first elastic arms 435. The fiber array unit 50 is clamped by the two second elastic arms 437, and the fiber array unit 50 is located between the two second elastic arms 437.

Because the optical engine 10, the coupling base 30, and the fiber array unit 50 are assembled together by using the first elastic arm 435 and the second elastic arm 437 of the limiting part 40, connection stability between the coupling base 30 and the optical engine 10 is further improved, thereby improving stability of an optical path.

In this implementation, an optical fiber in an optical fiber 53 of the fiber array unit 50 is of a linear structure. Because the optical fiber 53 does not need to be bent by 90°, an optical path formed by the second optical conduction portion 13, the coupling base 30, and the optical fiber 53 in the fiber array unit 50 extends along the first direction, thereby reducing an optical loss.

The fiber array unit 50 may further include an optical fiber tail sleeve (not shown in the figure), configured to fasten a pigtail of the optical fiber 53, to reduce stress on the optical fiber and reduce a risk of an optical fiber cut.

In this implementation, the reinforcing pad 60 is bonded to the core 11 (the second mounting surface 113 and/or the side surface 115) of the optical engine 10 by using an adhesive, and the reinforcing pad 60 is fastened on the first surface 311 of the base 31 by using an adhesive. An accommodation groove 62 is disposed on a surface that is of the reinforcing pad 60 and that faces the substrate 300, and the optical engine 10 passes through the accommodation groove 62. A contact area (for example, a bonding area) between the optical engine 10 and the coupling base 30 is increased by using the reinforcing pad 60, so that connection stability between the optical engine 10 and the coupling base 30 is enhanced (for example, bonding force is increased), and a risk that the coupling base 30 falls off due to plugging and removal of the fiber array unit 50 is reduced. In this implementation, to perform matching between thermal expansion coefficients of the reinforcing pad 60 and the optical engine 10, a material of the reinforcing pad 60 may be glass, or may be another material such as silicon or ceramic. During assembly, the coupling base 30 is first coupled to the light guide surface of the first optical conduction portion 13 of the optical engine 10 in an active coupling manner, and is fastened on the reinforcing pad 60 by using an adhesive.

The following briefly describes an assembly procedure of the optical interconnection system 1000.

Figure 22:
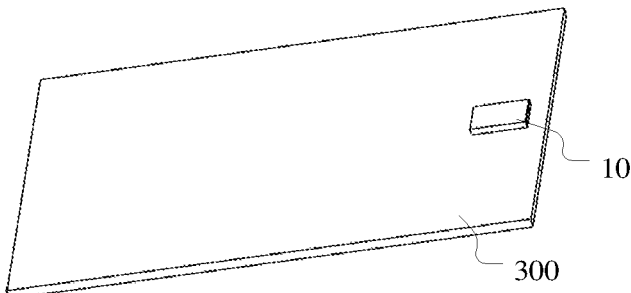
FIG. 22 is a schematic diagram of disposing an optical engine on a substrate according to a third implementation of this application.

As shown in FIG. 22, the optical engine 10 is disposed on the substrate 300. The optical engine 10 is fastened to the substrate 300 by using solder or an adhesive. An electrical connection between the optical engine 10 and the substrate 300 may be performed through binding with a gold wire, for example, by using a high-temperature reflow soldering process.

Figure 23:
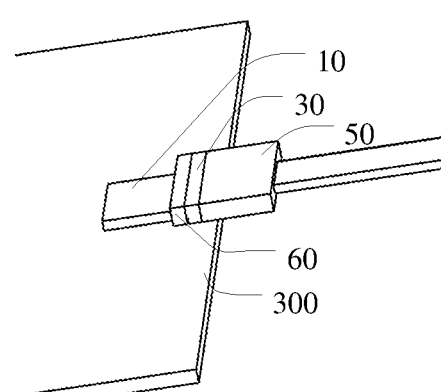
FIG. 23 is a schematic diagram of pre-interconnecting a coupling base, a reinforcing pad, and a fiber array unit according to a third implementation of this application.

As shown in FIG. 23, the reinforcing pad 60 is sleeved on the optical engine 10 fixedly, the fiber array unit 50 and the coupling base 30 are pluggably connected together, and the coupling base 30 is attached to the optical engine 10 in an active coupling manner. The optical engine 10 generally includes one or more pairs of straight-through waveguides coupled to the fiber array unit 50, and one or more pairs of corresponding channels are disposed in the fiber array unit 50 corresponding to the straight-through waveguides. One of each pair of channels is connected to an external light source, and the other is connected to an external optical power meter. During coupling, a link insertion loss is monitored online, and glue dispensing and curing are performed between the coupling base 30 and the optical engine 10 when the insertion loss is the smallest, so that alignment of a channel of the first optical conduction portion 13 of the optical engine 10, a channel of the second optical conduction portion 32, and a channel of the fiber array unit 50 is implemented. An optical engine 10, a coupling base 30, and a reinforcing pad 60 of another optical engine assembly 103 (shown in FIG. 16) are disposed on the substrate 300 in a similar manner.

Figure 24:
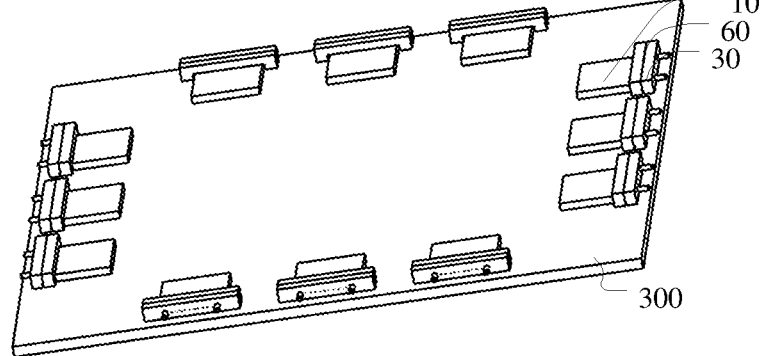
FIG. 24 is a schematic diagram of an optical interconnection system after a fiber array unit is removed according to a third implementation of this application.

As shown in FIG. 24, the fiber array unit 50 is removed. After the fiber array unit 50 is removed, an entire component with the optical engine 10 and the coupling base 30 may be connected to the substrate 300 through soldering or in another manner.

Figure 25:
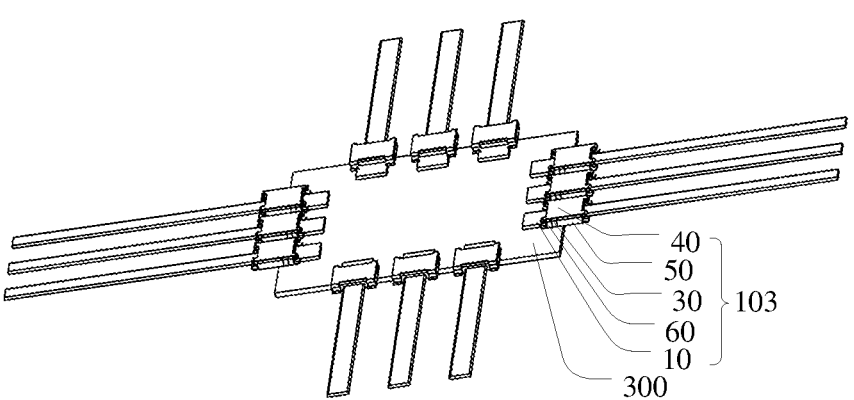
FIG. 25 is a schematic three-dimensional diagram of an assembled optical interconnection system according to a third implementation of this application.

As shown in FIG. 25, after assembly of other parts is completed, the fiber array unit 50 is passively coupled to the coupling base 30, and the limiting part 40 covers the reinforcing pad 60, the coupling base 30, and the fiber array unit 50 by using a fixture, so that the reinforcing pad 60, the coupling base 30, and the fiber array unit 50 are fastened in the clamping space of the limiting part 40. In this way, a final operation is completed. If an optical fiber cut occurs again after the fiber array unit 50 is inserted, remove and replace the fiber array unit 50.

It may be understood that the reinforcing pad 60 may be omitted, the elastic arm 43 includes the first elastic arm 435 and the second elastic arm 437, the connecting portion 431 of the first elastic arm 435 is connected to the first end of the main body 41 in the fastened manner, the connecting portion 431 of the second elastic arm 437 is connected to the second end of the main body 41 in the fastened manner, the main body 41, the first elastic arm 435, and the second elastic arm 437 jointly enclose the clamping space, and the coupling base 30 and the fiber array unit 50 are accommodated in the clamping space, the abutting portion 433 of the first elastic arm 435 abuts against the coupling base 30, and the abutting portion 433 of the second elastic arm 437 abuts against the fiber array unit 50.

It should be understood that expressions such as "include" and "may include" that may be used in this application indicate existence of the disclosed function, operation, or constituent element, and do not limit one or more additional functions, operations, and constituent elements. In this application, terms such as "include" and/or "have" may be interpreted as representing a particular feature, quantity, operation, constituent element, component, or a combination thereof, but shall not be construed as excluding existence or an addition possibility of one or more other features, quantities, operations, constituent elements, components, or combinations thereof.

In addition, in this application, the expression "and/or" includes any or all combinations of the words listed in the association. For example, the expression "A and/or B" may include A, may include B, or may include both A and B.

In this application, expressions including ordinal numbers such as "first" and "second" may modify elements. However, such elements are not limited by the expressions. For example, the foregoing description does not limit the order and/or importance of the elements. The expression is used only to distinguish one element from another. For example, first user equipment and second user equipment indicate different user equipment, although both the first user equipment and the second user equipment are user equipment. Similarly, without departing from the scope of this application, a first element may be referred to as a second element, and similarly, a second element may also be referred to as a first element.

When a component "connects" or "is connected" to another component, it should be understood that the component directly connects or is directly connected to the another component, or a further component may alternatively exist between the component and the another component. In addition, when a component "directly connects" or "directly connected" to another component, it should be understood that there is no component between them.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An optical engine assembly, comprising an optical engine, a coupling base, and a fiber array unit, wherein the coupling base is fastened on the optical engine, a first guide portion is disposed on the coupling base, a second guide portion is disposed on the fiber array unit, one of the first guide portion and the second guide portion is a guide rod, the other of the first guide portion and the second guide portion is a guide hole, the guide rod is pluggably connected to the guide hole, and the optical engine is configured to convert an optical signal to an electrical signal and to convert an electrical signal to an optical signal; and an optical signal that is input from the fiber array unit passes through the coupling base and reaches the optical engine, and/or an optical signal that is output by the optical engine passes through the coupling base and reaches the fiber array unit for outputting, wherein the optical engine comprises a core and a first optical conduction portion disposed on the core, the coupling base further comprises a base and a second optical conduction portion, the base is fastened on a surface of the core, the base and the core are disposed in a stacked manner, wherein the optical engine assembly further comprises a limiting part, and the limiting part is configured to limit locations of the fiber array unit and the coupling base relative to each other, wherein the limiting part comprises a main body and an elastic arm disposed in a manner of being connected to the main body, the main body covers the coupling base and a part of the fiber array unit, and the elastic arm abuts against the fiber array unit, wherein the main body has a hollow cavity, the coupling base is accommodated in the hollow cavity fixedly, the part of the fiber array unit penetrates the hollow cavity, and a side wall of the hollow cavity is attached to the coupling base and the fiber array unit, wherein the elastic arm comprises a connecting portion and an abutting portion that are connected to each other, a groove that is formed through the side wall of the hollow cavity is provided on the main body, the groove comprises a first end and a second end that are disposed opposite to each other in a direction in which the base and the core are stacked, the first end of the groove is disposed close to the optical engine, the connecting portion is fastened on a side wall of the first end of the groove, the connecting portion extends along the groove, and the abutting portion is exposed from the second end of the groove and abuts against the fiber array unit.

2. The optical engine assembly according to claim 1, wherein the second optical conduction portion is built in the base, the first optical conduction portion is optically coupled to the second optical conduction portion, and the first guide portion is disposed on a surface that is of the base and that facing is away from the core.

3. An optical engine assembly, comprising an optical engine, a coupling base, and a fiber array unit, wherein the coupling base is fastened on the optical engine, a first guide portion is disposed on the coupling base, a second guide portion is disposed on the fiber array unit, one of the first guide portion and the second guide portion is a guide rod, the other of the first guide portion and the second guide portion is a guide hole, the guide rod is pluggably connected to the guide hole, and the optical engine is configured to convert an optical signal to an electrical signal and to convert an electrical signal to an optical signal; and an optical signal that is input from the fiber array unit passes through the coupling base and reaches the optical engine, and/or an optical signal that is output by the optical engine passes through the coupling base and reaches the fiber array unit for outputting, wherein the optical engine comprises a core and a first optical conduction portion disposed on the core, the coupling base further comprises a base and a second optical conduction portion, the base is fastened on a surface of the core, the base and the core are disposed in a stacked manner, wherein the optical engine assembly further comprises a limiting part, and the limiting part is configured to limit locations of the fiber array unit and the coupling base relative to each other, wherein the limiting part comprises a main body and an elastic arm disposed in a manner of being connected to the main body, the main body covers the coupling base and a part of the fiber array unit, and the elastic arm abuts against the fiber array unit, wherein the elastic arm comprises a first elastic arm and a second elastic arm, each of the first elastic arm and the second elastic arm comprises a connecting portion and an abutting portion that are connected to each other, the main body comprises a first end and a second end that are disposed opposite to each other in a direction in which the base and the core are stacked, the first end of the main body is disposed close to the core, the connecting portion of the first elastic arm is connected to the first end of the main body fixedly, the connecting portion of the second elastic arm is connected to the second end of the main body fixedly, the main body, the first elastic arm, and the second elastic arm jointly enclose a clamping space, the coupling base and the part of the fiber array unit are accommodated in the clamping space, the abutting portion of the second elastic arm abuts against the coupling base, and the abutting portion of the second elastic arm abuts against the fiber array unit.

4. The optical engine assembly according to claim 3, wherein the optical engine assembly further comprises a reinforcing pad, the reinforcing pad is provided with an accommodation groove, the optical engine penetrates through the accommodation groove and is fastened together with the reinforcing pad, the base is fastened onto the reinforcing pad, the abutting portion of the first elastic arm abuts against the coupling base by using the reinforcing pad, and the reinforcing pad is located between the first elastic arm and the base.

5. The optical engine assembly according to claim 1, wherein the core comprises a first mounting surface, a second mounting surface, and a side surface, the side surface is fixedly connected between the first mounting surface and the second mounting surface, the base is fastened on the first mounting surface, the first optical conduction portion comprises an optical waveguide and a refraction member on which an optical path interconnection is performed, and an optical path interconnection is performed on the refraction member and the second optical conduction portion.

6. The optical engine assembly according to claim 1, wherein the first optical conduction portion comprises an optical waveguide, the optical waveguide is built in the core, the core comprises a first mounting surface, a second mounting surface, and a side surface, the side surface is fixedly connected between the first mounting surface and the second mounting surface, the first mounting surface is fixedly connected to a substrate, a light guide surface of the optical waveguide is located on the side surface, the base is fastened on the side surface, and the second optical conduction portion is optically coupled to the light guide surface of the optical waveguide.

7. The optical engine assembly according to claim 1, wherein the fiber array unit comprises a light guide base and an optical fiber fastened on the light guide base, the light guide base, the base, and the core are sequentially disposed in a stacked manner, an abutting step is convexly disposed on an outer wall of the light guide base, and the second guide portion is disposed on a surface that is of the guide base and that faces the base, and the elastic arm abuts against the abutting step.

8. An optical interconnection system, comprising a substrate, an electrical switching chip, and the optical engine assembly according to claim 1, wherein the electrical switching chip is disposed on the substrate, the optical engine assembly is disposed on the substrate, and the electrical switching chip is electrically connected to an optical engine of the optical engine assembly.

9. The optical interconnection system according to claim 8, wherein the substrate comprises a first substrate and a second substrate that are disposed in a stacked manner, the electrical switching chip is disposed on a surface that is of the second substrate and that is away from the first substrate, and the optical engine is disposed on the surface that is of the second substrate and that is away from the first substrate.

10. A network device, comprising a system circuit board and the optical interconnection system according to claim 7, wherein the optical interconnection system is disposed on the system circuit board.

11. The optical engine assembly according to claim 3, wherein the second optical conduction portion is built in the base, the first optical conduction portion is optically coupled to the second optical conduction portion, and the first guide portion is disposed on a surface that is of the base and that is facing away from the core.

* * * * *